United States Patent
Kemer et al.

(10) Patent No.: US 6,729,696 B2
(45) Date of Patent: May 4, 2004

(54) TWO STEP PARK RELEASE VALVE

(75) Inventors: John J. Kemer, Avon Lake, OH (US); Andrew Marsh, Elyria, OH (US)

(73) Assignee: Bendix Commercial Vehicle Systems, LLC

( * ) Notice: Subject to any disclaimer, the term of this patent is extended or adjusted under 35 U.S.C. 154(b) by 9 days.

(21) Appl. No.: 09/852,232

(22) Filed: May 8, 2001

(65) Prior Publication Data

US 2002/0167219 A1 Nov. 14, 2002

(51) Int. Cl.⁷ ............................................. B60T 13/00
(52) U.S. Cl. .............................. 303/7; 91/426; 137/596
(58) Field of Search .......................... 91/426; 137/596; 303/7

(56) References Cited

U.S. PATENT DOCUMENTS

| | | |
|---|---|---|
| 4,169,633 A | 10/1979 | Stearns |
| 4,330,157 A | 5/1982 | Sebo |
| 4,673,222 A | 6/1987 | Knight |
| 4,844,553 A | 7/1989 | Bliss |
| 5,163,353 A * | 11/1992 | Horstmann et al. ........... 91/426 |
| 5,273,308 A * | 12/1993 | Griffiths .................. 280/6.151 |
| 5,458,403 A | 10/1995 | Moody |
| 5,511,860 A | 4/1996 | Wallestad et al. |
| 5,533,795 A | 7/1996 | Brooks |

OTHER PUBLICATIONS

Bendix, Service Data SD–03–3619, "PP–DC Park Control Valve", Honeywell Commercial Vehicle Systems Company, Jun. 1999.
Bendix, Service Data SD–03–3415, "MV–3 Dash Control Module", Honeywell Commercial Vehicle Systems Company, Jan. 1999.

* cited by examiner

Primary Examiner—Gerald A. Michalsky

(57) ABSTRACT

A braking system control requires that a first or service braking system be actuated before a second or parking braking system can be released to prevent unexpected movements. A sensor senses that the service brakes are engaged and controls a device to release the parking brakes. A latch ensures that the parking brakes remain released. For example, a piston and check valve form the sensor and latch. Service brake pressure works against the piston. Above a threshold level, service brake pressure drives the piston to open a valve that provides pressurized air to a parking brake release system. Once released, the check valve directs parking brake release pressure to the piston to keep the valve open.

32 Claims, 15 Drawing Sheets

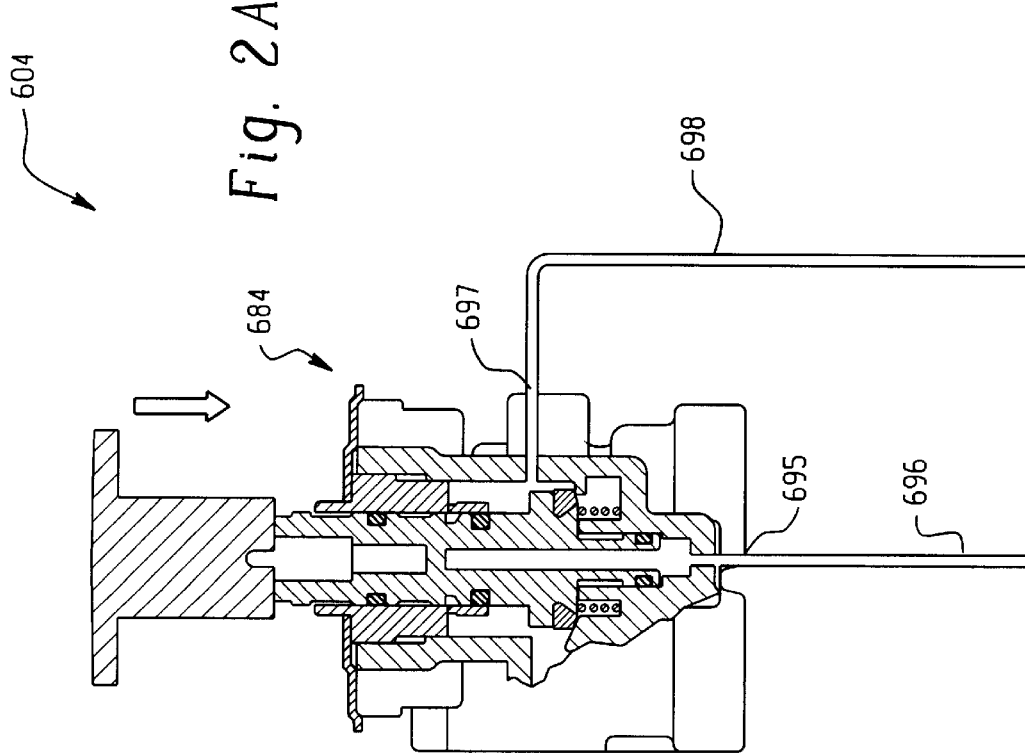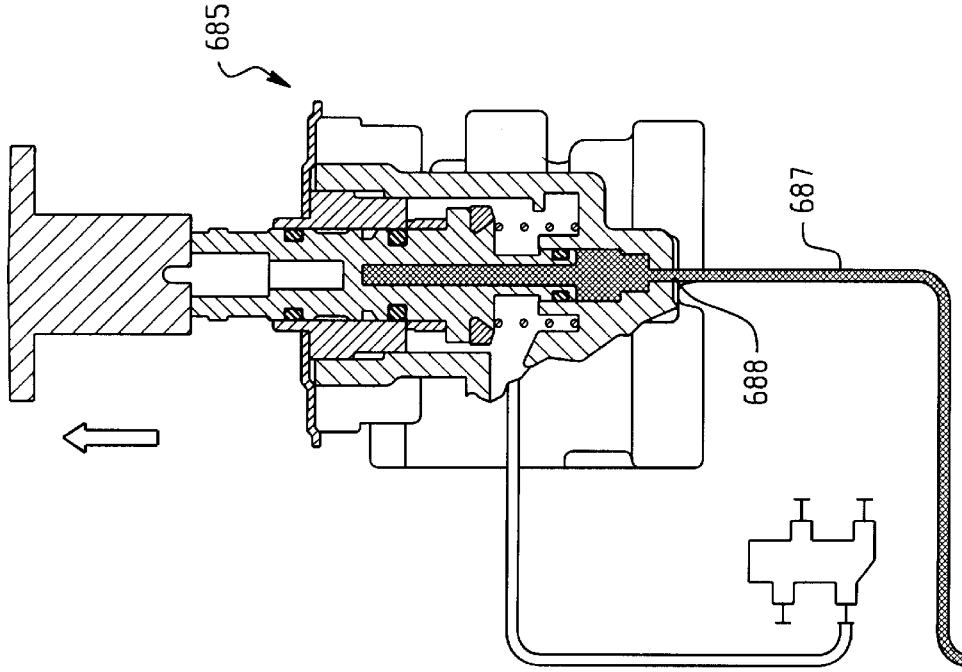

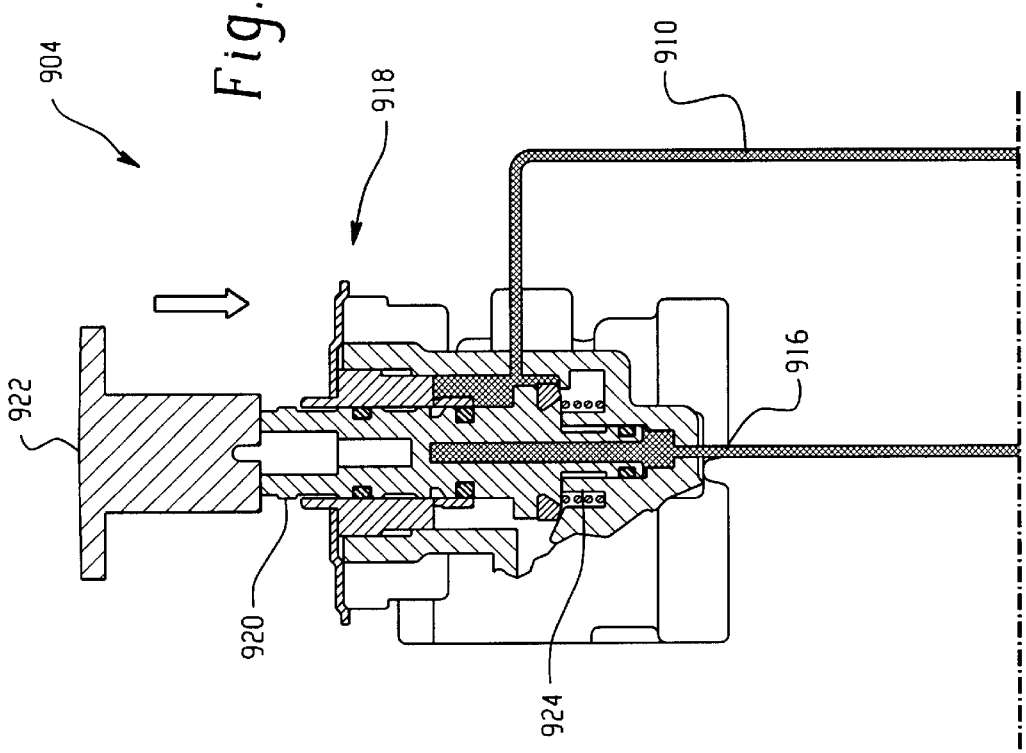
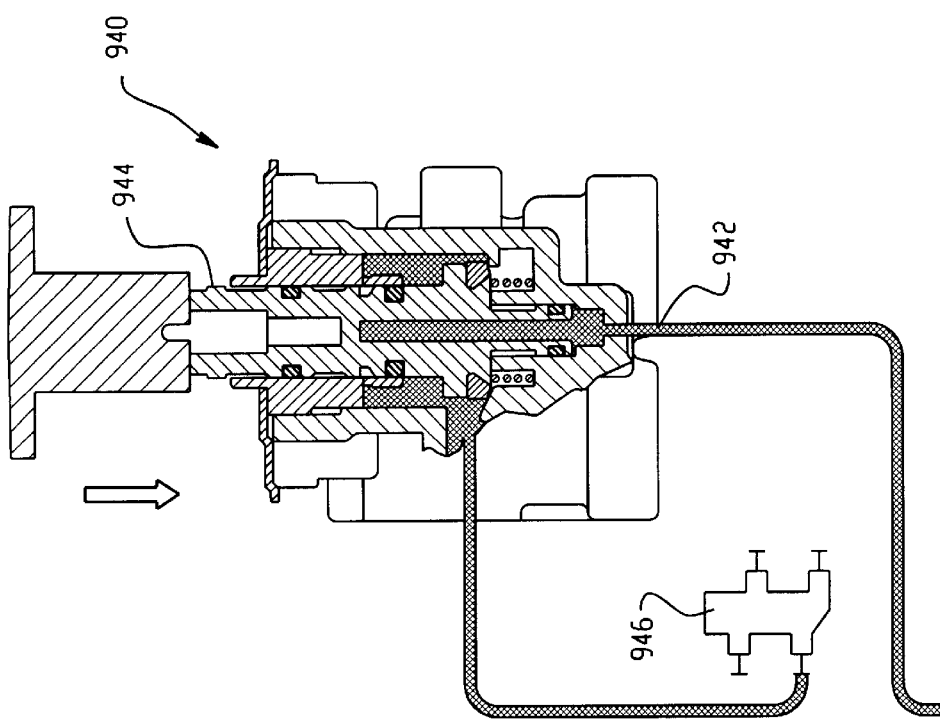

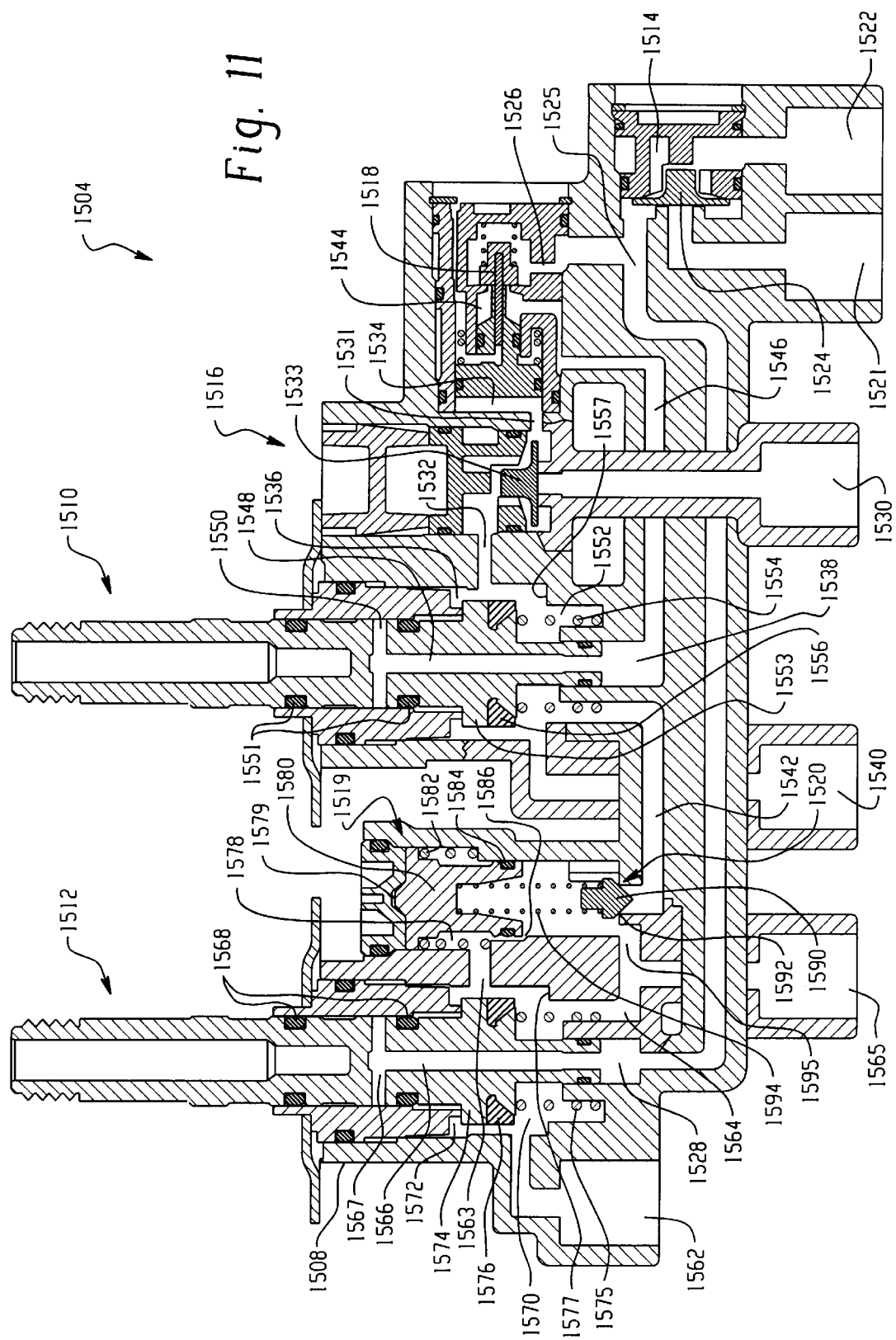

TWO STEP PARK RELEASE VALVE

BACKGROUND OF THE INVENTION

The invention relates to the art of vehicle braking systems. The invention finds particular application in heavy trucks, tractors and buses. The invention will be described in relation to an air pressure braking system of a tractor-trailer truck system. However, the invention may be applied to other braking systems such as those of other kinds of vehicles and those based on other technologies such as hydraulic or electronic braking systems.

U.S. Pat. No. 4,844,553 to Bliss and U.S. Pat. No. 4,330,157, incorporated herein by reference, disclose control valve arrangements for use in a braking system. The valve arrangements include a pair of valve actuators or plungers that are operated by a vehicle operator. One of the actuators controls communication between an air pressure source and a tractor parking/emergency brake system. The tractor parking/emergency brake system includes spring brakes that are actuated to resist wheel rotation. A force of an included spring or set of springs in the spring brakes urges a braking member against the wheel. During vehicle operation, air pressure is applied against a piston that is associated with the springs. The force applied against the piston counteracts the force of the springs thereby releasing the spring brake and allowing the wheels of the vehicle to rotate. The other actuator controls communication between the pressure source and service brakes of a trailer.

In addition to providing for manual application and release of the parking/emergency brakes, the disclosed valve arrangements also provide for the automatic application of brakes should the source or actuation pressure fall below a threshold. That is to say, the first actuator is forced into a pressure exhaust position by internal springs if the source pressure drops below a first threshold. Similarly the other actuator is forced into a pressure exhaust position if the pressure drops below a second threshold. This provides for the trailer brakes and the tractor brakes to be applied in an appropriate order should a malfunction or leak occur in the braking system.

One feature the prior art valve arrangements do not provide is an assurance that a vehicle operator has actuated the service brakes before the parking brakes are released. As a result, the vehicle could roll unexpectedly when the operator releases the parking brakes.

Therefore, a braking system interlock arrangement that requires the service brakes of a vehicle to be engaged before the parking brakes of the vehicle can be disengaged is desired.

BRIEF SUMMARY OF THE INVENTION

To that end, a new vehicle braking control system has been developed. The braking control system is operative to prevent the parking brakes from releasing the wheels of the vehicle unless service braking is applied.

A valve assembly includes a double check valve and an inlet valve. The double check valve includes an inlet port, a locking pressure port, and an outlet port. The check valve is operative to place one of the inlet port and the locking pressure port in communication with the outlet port. Additionally, the check valve prevents communication between the inlet port and the locking port. The position of the double check valve is based on relative air pressures at the inlet and locking ports.

The inlet valve includes a second inlet port, a second outlet port, and a control port, the control port being in communication with the outlet port of the double check valve. The inlet valve is operative to place the second inlet port in communication with the second outlet port when a pressure at the control port is above a threshold.

Typically a pressure source is connected to the second inlet port and the second outlet port delivers pressurized air from the second inlet port to the second air pressure subsystem.

The double check valve and inlet valve work together and form a pressure sensor, a system pressure valve, and a latching mechanism. The system pressure valve is controlled by the pressure sensor. For example, the system pressure valve opens when a sensed pressure is above a first threshold and closes when the sensed pressure is below a second threshold. The first and second thresholds may be the same. Preferably, the second threshold is below the first threshold. The system pressure valve includes a system pressure valve inlet and a system pressure valve outlet. The system pressure valve is operative to direct pressurized air delivered to the system pressure valve inlet to the secondary braking system through the system pressure valve outlet when the system pressure valve is open and to prevent pressurized air from reaching the secondary braking system when the system pressure valve is closed. The latching mechanism is operative to direct a higher one of a primary braking system control pressure and a secondary braking system releasing pressure to the pressure sensor. As long as the pressure directed to the pressure sensor is above the second threshold, the system pressure valve is kept open.

One advantage of the present invention is the prevention of unexpected vehicle movements.

Another advantage of the present invention resides in compatibility of the invention with prior braking systems.

Still other advantages and benefits of the invention will become apparent to those skilled in the art upon a reading and understanding of the following detailed description.

BRIEF DESCRIPTION OF THE DRAWINGS

The invention may take form in various components and arrangements of components, and in various steps and arrangements of steps. The drawings are only for purposes of illustrating preferred embodiments, they are not to scale, and are not to be construed as limiting the invention.

FIGS. 2A and 2B are a diagram showing a first valve assembly configured as a braking system control block operative to require a two-step brake release process, the valve assembly being in a first operational state.

FIGS. 5A and 5B are a diagram showing the valve assembly of FIGS. 2A and 2B in a fourth operational state.

FIG. 11 is a functional diagram of a third valve assembly configured as a braking system control block operative to require a two-step brake release process.

DETAILED DESCRIPTION OF THE INVENTION

Figure 1:
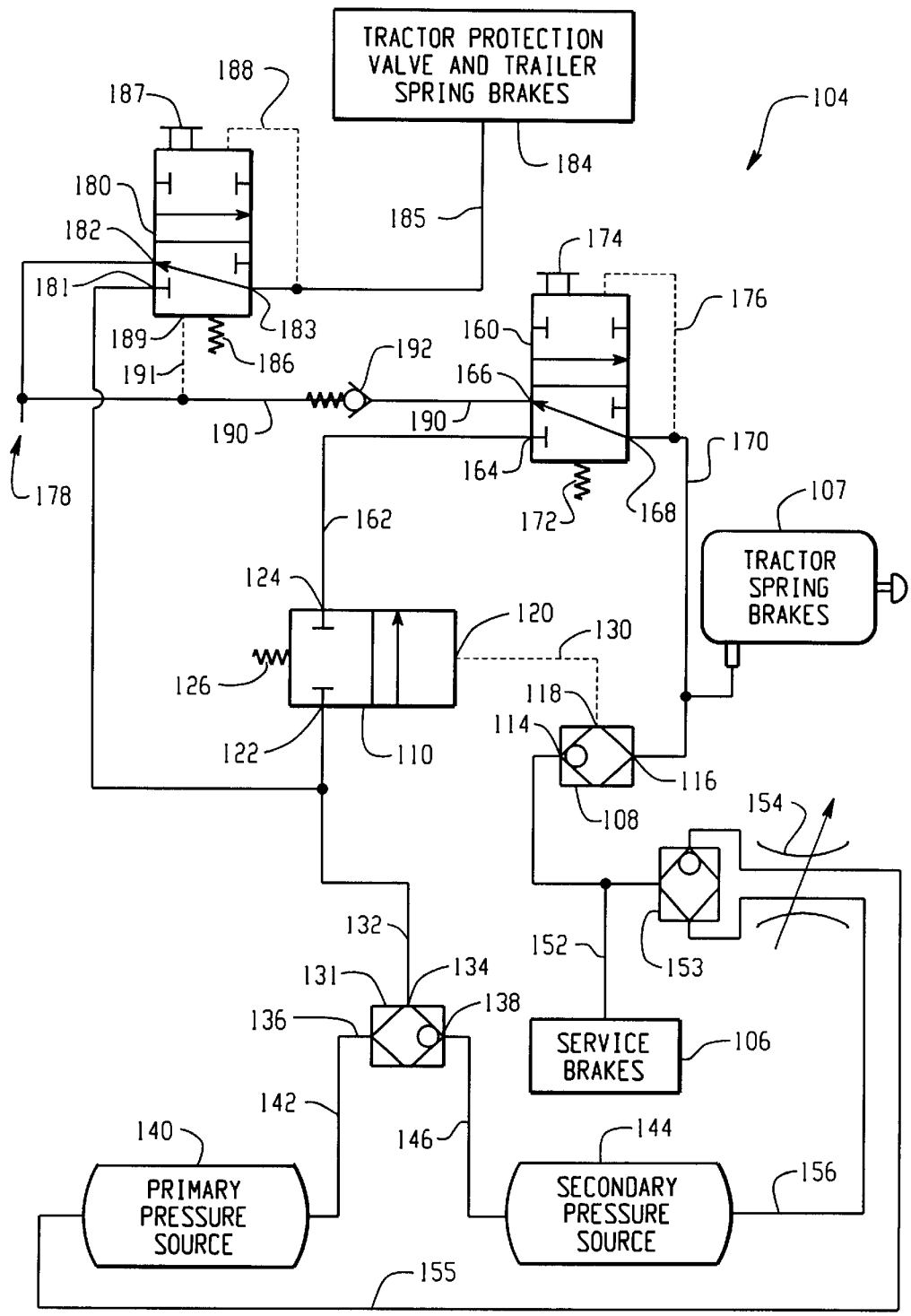
FIG. 1 is a schematic diagram illustrating the control logic of a braking system control block operative to require a two-step brake release process.

Referring to FIG. 1, a valve assembly 104 operative to require an operator of a vehicle to apply service brakes 106 of the vehicle before parking or spring brakes 107 can be released includes a control double check valve 108 and an inlet valve 110. The inlet valve 110 and control double check valve 108 co-operate to form a sensor, system inlet valve, and an interlock device. As will be seen below, the sensor monitors the state of the vehicle braking system. The system inlet valve directs pressure to certain parts of the braking system at appropriate times as determined by the sensor. The interlock latches the sensor and system inlet valve into a permissive or open state when appropriate.

More particularly, the control double check valve 108 includes a service pressure port 114, a locking pressure port 116, and a control pressure outlet 118. The control double check valve 108 operates to direct system status information to the sensor. For example, the information is in the form of system pressures. The control double check valve 108 directs a greater of pressures applied at the service pressure port 114 and the locking pressure port 116 to the control pressure outlet 118.

The inlet valve 110 includes an actuating pressure port 120, an input or supply pressure input port 122, and an output or supply pressure delivery port 124. Additionally the valve includes a biasing member 126 for urging the inlet valve toward a closed position, thereby blocking air flow to the supply pressure delivery port 124 from the supply pressure input port 122. The actuating pressure port 120 communicates with the control pressure outlet 118 of the control double check valve 108 through a control check valve output channel 130. When air pressure delivered to the actuating pressure port 120 exceeds that required to counteract the urging force of the biasing member 126 the inlet valve is actuated to permit flow and pressure equalization between the input port 122 and delivery port 124.

The input port 122 communicates with a supply pressure source through a supply selector double check valve 131 and a supply conduit 132. The supply conduit connects to the check valve at a selected supply delivery port 134. The supply selector double check valve 131 includes a primary supply port 136 connected to a primary supply reservoir 140 via a primary supply line 142 and a secondary supply port 138 connected to a secondary supply reservoir 144 via a secondary supply line 146. The supply selector double check valve 131 directs a higher of pressures from the primary supply port and the secondary supply port to the selected supply delivery port 134.

Typically, the pressurized air is delivered to the supply reservoirs 140, 144 by one or more pumps or compressors (not shown). The pressurized air is used to actuate various components of the vehicle braking system. For example, the pressurized air is used to drive a piston and counteract the force of the spring thereby releasing the brake pads from engagement with the wheel (not shown) in a spring brake 107.

The control double check valve 108 and the inlet valve 110 work together to provide pressurized air for releasing the parking brakes 107 at appropriate times. When it is inappropriate to release the parking brakes the control double check valve 108 and the inlet valve 110 work together to prevent the delivery of pressurized air to the spring brake 107.

For example, port 114 of the control double check valve 108 communicates with a service brake line 152 to receive pressurized air from a service supply double check valve 153. The check valve 153 directs, for example a higher of two pressures delivered from a proportional valve 154 to the service brake line. Here, the proportional valve 154 is operatively associated with a brake pedal (not shown) of the vehicle. The proportional valve 154 receives pressurized air from a primary service supply conduit 155 and a secondary service supply conduit 156. The proportional valve 154 proportions the pressures delivered to it. For example, the proportional valve 154 delivers a proportioned primary supply pressure and a proportioned secondary supply pressure to the service supply double check valve 153. The proportioned pressures depend on the degree of actuation of the proportional valve 154. For example, if the brake pedal is not actuated at all, then the delivery pressures of the proportional valve 154 are 0 psi. If the brake pedal is partially depressed then a percentage or fraction of the primary and secondary supply pressures are delivered to service supply double check valve 153. Obviously, various pressures or fractional pressures may be delivered as well. The service supply double check valve 153 then directs one of the supplied pressures to the service brake line 152 to effect braking. When the pressure in the service brake line 152 is higher than a pressure at the locking pressure port 116 the control double check valve operates to deliver the service brake line pressure to the actuating pressure port 120 of the inlet valve 110, thereby indicating that degree to which the service brakes are applied to the wheels of the vehicle. When the pressure at the actuating pressure port 120 exceeds a predetermined threshold, for example 25 psi, the inlet valve 110 directs supply pressure from the supply conduit 132, to the supply delivery port 124 where it releases the spring brakes 107 once the plunger is actuated as will become more apparent below.

For example, the supply delivery port 124 is connected to a parking/emergency brake control valve via a first control valve supply conduit 162. The parking/emergency brake control valve is preferably a tractor spring brake control valve 160 that includes tractor spring brake supply port 164, a tractor spring brake exhaust port 166, and a tractor spring brake delivery port 168. The spring brake delivery port communicates with the tractor spring brake system 107 via a spring brake pressure line 170. Additionally, the spring brake pressure line 170 provides spring brake pressure to the locking pressure port 116 of the control check valve. A biasing spring 172 urges the tractor spring brake control valve toward an exhaust state, wherein any pressure stored in the spring brakes 107 is normally vented via the tractor spring brake exhaust port 166.

It is anticipated that in a comparable electrical braking system, energy will not be stored in the braking system. Therefore, in an electrical analog to the exhaust state, the parking brakes would simply be de-powered. However, some designs, such as, for example capacitive and inductive designs may benefit from energy regeneration or dissipation. Therefore in an electrical analog to the exhaust state, the parking brakes may be connected to an energy storage device or a dummy load.

As described above, in order to release the parking or spring brakes 107 the operator must first apply the service brakes. Additionally, the operator must also actuate a plunger button or control switch 174 associated with the tractor spring brake control valve 160. Actuating the plunger button positions the control valve 160 in a spring brake pressurization state wherein pressurized air at the supply port 164 is directed to the delivery port 168. Additionally, supply pressure or pressurized air at the spring brake delivery port is applied to a tractor spring brake control valve pilot or control port 176. Supply pressure at the pilot port 176 latches or holds the tractor spring brake control valve in position after the operator releases the plunger button 174, thereby latching the tractor spring brake control valve 160 in the spring brake pressurization state. Furthermore, system status information, in the form of spring brake pressure, delivered to the locking pressure port 116 of the control double check valve 108 is directed to the actuation port 120 of the inlet valve 110, thereby locking or latching the inlet valve in a supply pressure delivery state in response to the secondary or spring brakes being in a released state. The control double check valve 108 also operates to isolate the service brake line 152 from the spring brake system.

When the operator desires to again park the vehicle and apply the parking/spring brakes 107, the operator actuates the plunger button to overcome a force associated with the spring brake pressure applied to the tractor spring brake control valve pilot port 176. This returns the tractor spring brake control valve 160 to the exhaust state. Pressure at the tractor spring brake delivery port 168 is vented to exhaust port 166 and the spring brakes engage the wheels of the vehicle. Additionally, pressure at the locking pressure port 116 is relieved. Therefore, pressure is relieved from the actuating pressure port 120 of the inlet valve 110. The spring 126 then urges the inlet valve into a closed position, thereby preventing the release of the parking brakes 107 without a prior application of the service brakes 106.

Optionally, the valve assembly 104 includes a trailer air supply valve 180. As is known in the art, the trailer supply valve 180 directs supply air for releasing brakes of a trailer. Additionally, trailer air pressure is made available to power trailer accessories such as conveyer belts, ramps and lifts. Preferably, supply air from the trailer air supply valve is delivered to the trailer system through a tractor protection valve. The tractor protection valve serves to isolate the tractor systems from the trailer in the event of an unintentional disconnection.

The trailer air supply valve 180 includes a trailer air supply port 181, trailer air exhaust port 182, and trailer air delivery port 183. The delivery port 183 is connected to a trailer air system 184 via a trailer air line 185. A biasing member or spring 186 urges the trailer air supply valve 180 to an exhaust state position where pressure in the trailer air system 184 is vented to atmosphere 178. Preferably, the trailer air supply port 181 receives air directly from a pressurized air source, for example, from a branch of supply conduit 132. In order to supply air to the trailer systems 184, the operator must actuate a plunger button 187 associated with the trailer air supply valve 180. Actuating the plunger directs pressure at the trailer air supply port 181 to the trailer air delivery port 183. Additionally, supply pressure at the trailer air delivery port 183 is applied to a trailer air supply valve pilot or control port 188. Supply pressure at the pilot port 188 holds the trailer air supply valve plunger (not shown) and button 187 in position after the operator releases the plunger button 187, thereby holding the trailer air supply valve 180 in the trailer system pressurization state.

When the operator desires to actuate the trailer spring brakes, the button 187 is actuated to return the trailer air supply valve 180 to the exhaust position where pressure at the trailer air delivery ports 183 is vented through the exhaust port 182. The trailer spring brakes (not shown) are depressurized from their retracted position and allowed to engage the wheels of the trailer.

Preferably, the trailer air supply valve 180, also includes a reset pilot or control port 189. The reset pilot port 189 is used to automatically ensure that the trailer air supply valve 180 is in the exhaust position while the vehicle is in certain operating modes. For example, if the operator changes the emergency/parking spring brakes 107 from a released vehicle in service state, to an applied vehicle parked state, the trailer air system should be placed in a depressurized state. Therefore, the reset pilot port 189 preferably communicates with an exhaust conduit 190 that carries exhaust flow from the tractor spring brake exhaust port 166. When the tractor spring brake control valve 160 is placed in an exhaust state in order to vent or relieve pressure in the parking or spring brakes 107, pressurized air flows in exhaust conduit 190, thereby raising a pressure in the exhaust conduit 190 and through a reset pilot line 191 raising a pressure at the reset pilot port 189. The increased pressure at the reset pilot port 189 provides a force that in conjunction with the spring force 186 overcomes the force provided at the pilot port 188. Therefore, the trailer air supply valve plunger (not shown) and button 187 are returned to the exhaust position.

As illustrated in U.S. Pat. No. 4,844,553, some embodiments may benefit from the inclusion of a single check valve 192 in the exhaust conduit 190. The single check valve 192 allows exhaust air to flow from the control valve 160 through the exhaust conduit 190 but prevents exhaust air from the trailer air supply valve from reaching the tractor spring brake control valve 160.

Figure 2B:
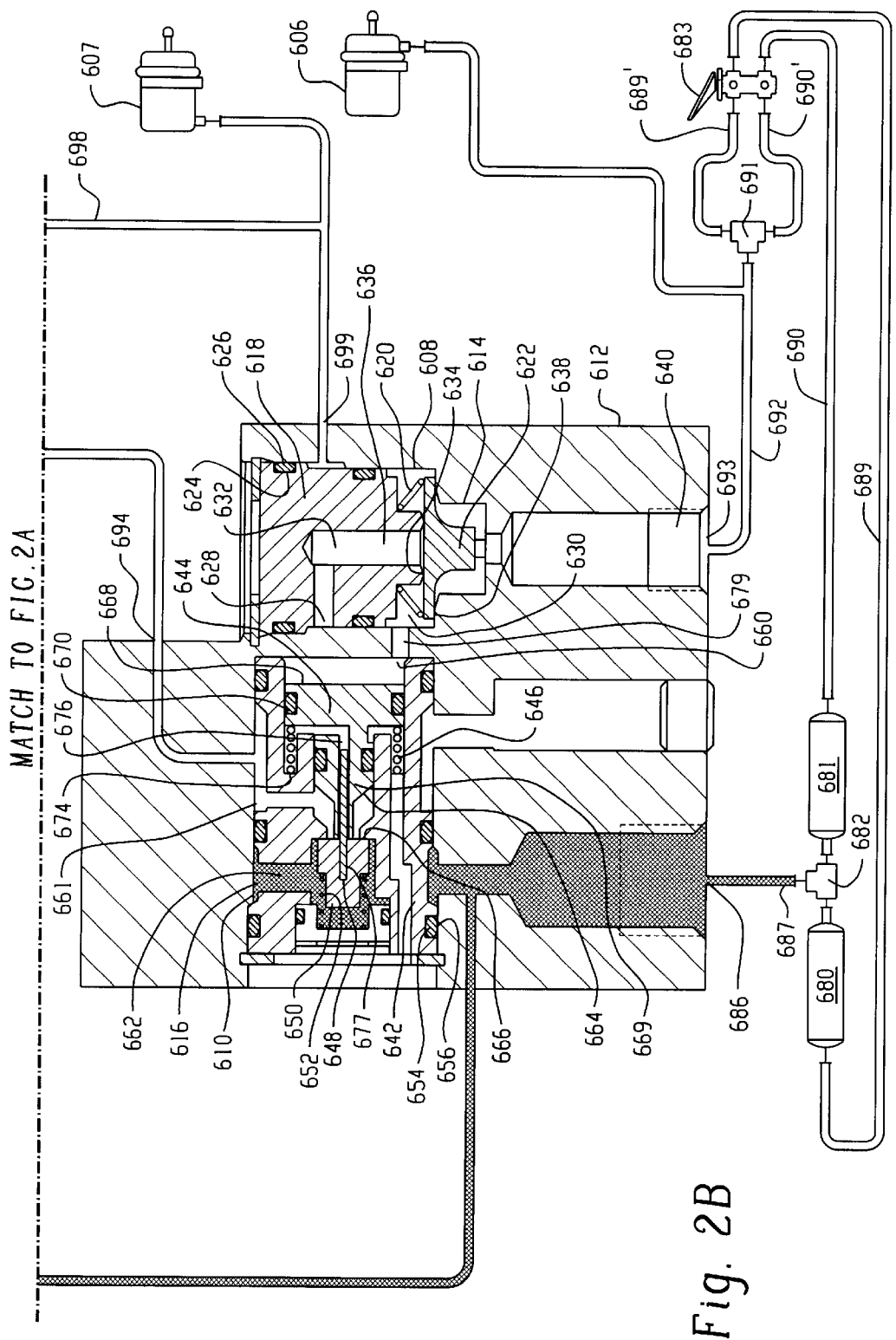

Having described the invention in general terms, details of an exemplary embodiment are now discussed. Referring to FIGS. 2A and 2B, a valve assembly 604 requires an operator of a vehicle to apply service brakes 606 of the vehicle before parking spring brakes 607 of the vehicle are released. The valve assembly comprises a control double check valve 608 and an inlet valve 610. The control double check valve 608 and inlet valve 610 preferably reside in a common housing 612. The housing 612 includes a check valve chamber 614 and an inlet valve chamber 616.

The control double check valve 608 includes a spacer 618, a biasing spring 620, and check valve member 622. The spacer includes grooves 624 that carry seals such as o-rings 626. The seals 626 divide the check valve chamber 614 into a first region 628 and a second region 630. The spacer 618 includes a passage 632 that provides communication between the first region 628 and the second region 630. Additionally, the spacer includes a first valve seat 634 operative to receive the check valve member 622. As will be further described in reference to FIGS. 3A and 3B, a second region end 636 of the passage 632 is closed when the first valve seat 634 receives the check valve member 622.

The spring 620 is located between the spacer 618 and the check valve member 622, urging the check valve member 622 toward a second valve seat 638. When seated on the second valve seat 638, the check valve member 622 isolates the second region 630 from a service pressure port 640.

The inlet valve 610 includes a valve frame 642, a piston 644, a piston spring 646, a valve guide 648, an inlet valve member 650, and an inlet valve member return spring 652. The valve frame 642 includes a set of grooves 654 carrying associated seals 656 that divide the inlet valve chamber 616 into a third region 660, fourth region 661, and fifth region 662. The valve frame 642 also includes a piston guide region 664 and an inlet valve seat 666. The inlet valve seat 666 is located at a boundary between the fourth 661 and fifth 662 regions of the inlet valve chamber.

During inlet valve 610 operation, the inlet valve member is occasionally seated on the inlet valve seat 666. During those times, the inlet valve member 650 and the inlet valve seat 666 form a seal separating the fourth 661 and fifth 662 inlet valve regions. When the inlet valve member 650 is not seated on the inlet valve seat 666, there is free communication between the fourth 661 and fifth regions 662. As will be explained in greater detail below, the valve frame 642 also includes various grooves, cutouts and passages that, either alone, or in co-operation with various inlet valve components, form passages or conduits for air flow.

The piston 644 has a piston head 668 and a shaft portion 669. The piston head 668 and the shaft 669 each include grooves carrying seals 670 to maintain isolation between the third and fourth inlet valve regions 660, 661. The shaft 669 is slidably received in the piston guide region 664 of the frame 642. The piston is urged toward the third region 660 by piston spring 646. The piston spring 646 is mounted between an overhang portion of the piston head 668 and a piston spring support 674 portion of the inlet valve frame 642. The piston shaft 669 includes a valve guide bore 676. The valve guide bore 676 is located axially with respect to the piston shaft 669.

The valve guide 648 is, for example, a pin. The valve guide 648 is received within the valve guide bore 676. A portion of the valve guide 648 projects outwardly from the valve guide bore into the fifth region 662 of the inlet valve chamber 616.

Preferably, the inlet valve member 650 is made of a resilient material such as rubber. The inlet valve 650 member includes a valve guide bore 677 axially located with respect to the inlet valve member 650. The guide bore 677 receives a tip of the projecting portion of the valve guide 648 to axially locate the inlet valve member 650 within the fifth region 662 of the inlet valve chamber 616.

The second region 630 of the control double check valve 608 communicates with the third region 660 of the inlet valve 610 through a second passage 679. In addition to the control double check valve 608 and the inlet valve 610, the first embodiment 604 further comprises a primary pressurized air source 680, a secondary pressurized air source 681, a source selection valve 682, a service brake actuator or pedal 683, a tractor spring brake control valve 684, and a trailer air supply valve 685.

The primary and secondary pressure sources 680, 681, respectively, are each connected to the source selection valve 682 which directs air from one of the pressure sources to an inlet port 686 of the inlet valve 610 through a supply conduit 687. The supply conduit 687 also supplies a trailer valve inlet 688. The primary and secondary pressure sources are also each connected to the service brake actuator 683 through first and second service supply lines 689, 690, respectively The service brake actuator 683 delivers proportioned pressure outputs to a second source selection valve 691 through first 689' and second 690' respective service actuator output lines. The pressures delivered in output lines 689', 690' are related to both their respective supplies 680, 681 and the position of the service brake actuator 683. The second source selection valve 691 connects one of the output lines 689', 690' to a service brake line 692 based on the relative pressures of the airs contained within the output lines 689', 690'. For example, the output line containing air at a higher pressure is directed to the service brake line 692.

The service brake line delivers the selected output pressure to the service brakes 606 of the vehicle. Additionally a branch of the service brake line delivers the selected output pressure to a control inlet 693 of the control double check valve 608. When the check valve member is not seated on the second valve seat 638, the control inlet 693 communicates with the second region 630 of the control double check valve 608.

An inlet valve outlet port 694 is connected to a tractor spring brake valve inlet port 695 through an inlet valve output conduit 696. The inlet valve outlet port 694 communicates with the fourth region 661 of the inlet valve 610.

A tractor valve delivery port 697 is connected to a spring brake line 698. A branch of the spring brake line 698 is connected to a lockout port 699 of the control double check valve. The lockout port 699 communicates with the first region 628 of the control double check valve 608.

As depicted in FIGS. 2A and 2B, the first embodiment 604 of a valve assembly is in a brake release prevention state. Supply pressure is available in the supply conduit 687. Additionally, a plunger button of the tractor spring brake control valve 684 has been actuated. Therefore, the tractor spring brake control valve 684 is configured to deliver air to the spring brakes 607 thereby causing the spring brakes to release the wheels (not shown). However, the service brake actuator 683 has not been actuated and therefore no pressure is applied to the control input 693 of the control double check valve and no pressure is applied to the piston 644 to counteract the force of the spring 646. Therefore, the piston is positioned toward the third region 660 and the inlet valve member 650 is seated on the inlet valve seat 666.

Although supply pressure is available at the inlet valve inlet 686 and therefore in the fifth region, there is no communication between the fifth and fourth regions. Therefore supply pressure is not available at the inlet valve outlet port 694 and no supply pressure is available at the tractor spring brake valve inlet 695. Deprived of supply pressure, the tractor spring brake control valve cannot deliver pressurized air to the spring brake line even though the valve is configured to do so. Therefore, the spring brakes remain engaged and the vehicle is prevented from rolling unexpectedly.

Figure 3A:
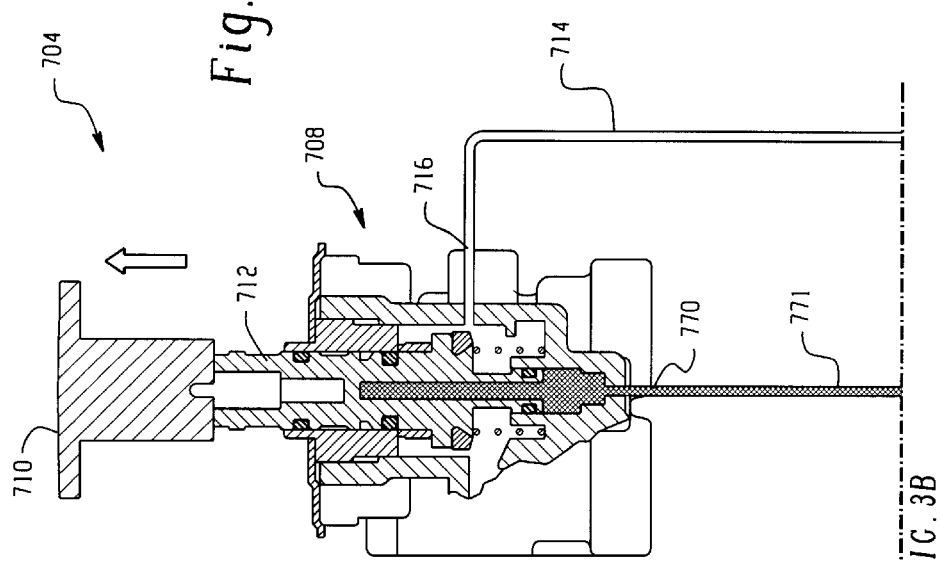
FIGS. 3A and 3B are a diagram showing the valve assembly of FIGS. 2A and 2B in a second operational state.
Figure 3A:
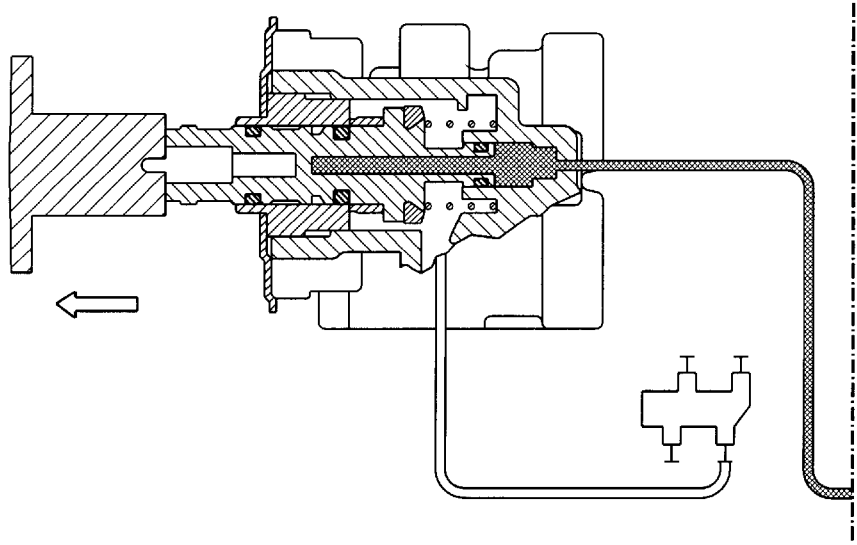
Figure 3B:
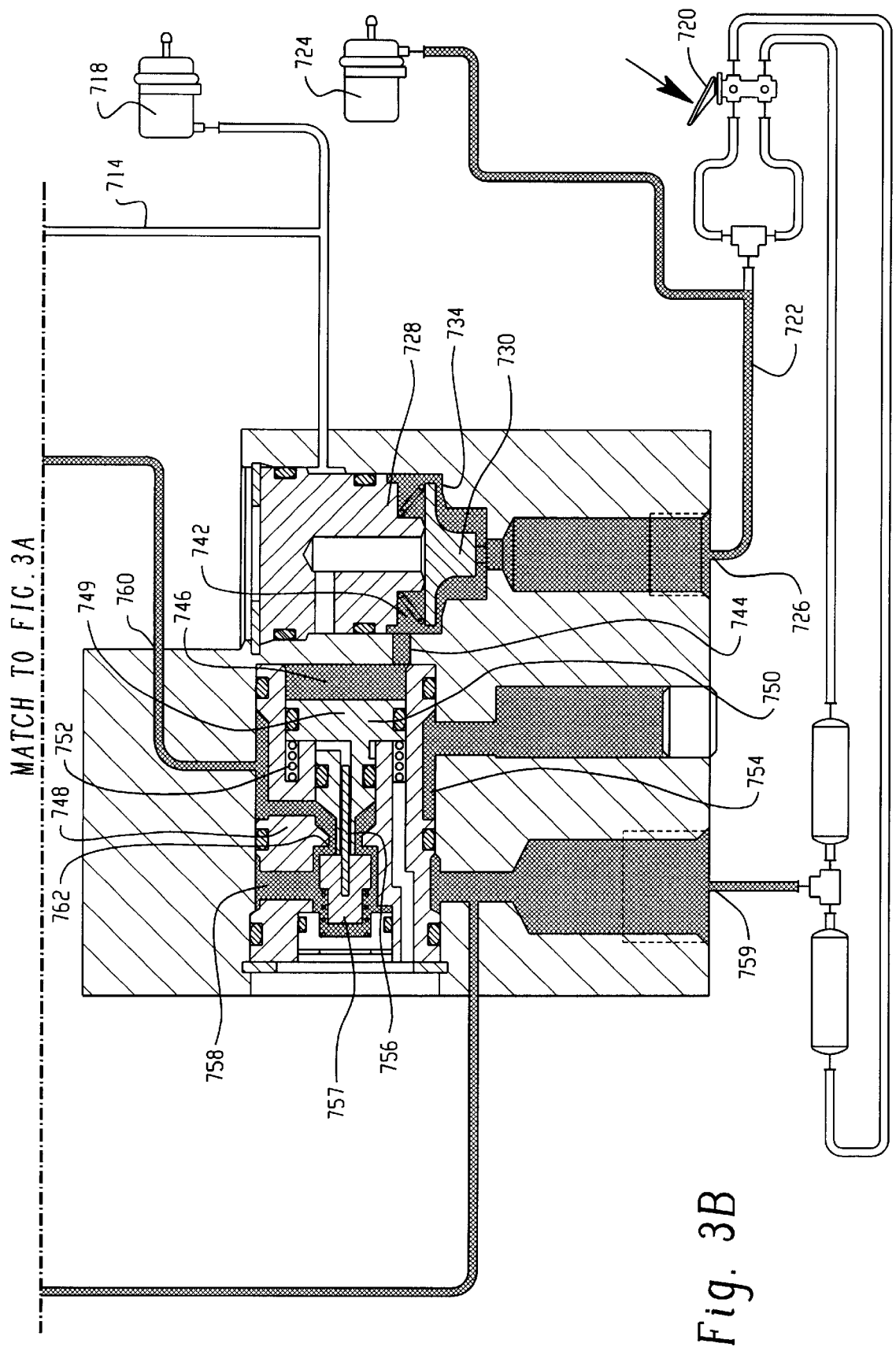

Referring to FIGS. 3A and 3B, the valve assembly 704 illustrates a second operational state of the FIGS. 2A and 2B embodiment. In the second operational state, a tractor spring brake control valve 708 is in a spring brake exhaust configuration. A tractor valve button 710 and associated plunger 712 is actuated (lifted upwardly as shown), thereby directing pressurized air in spring brake line 714 connected at a spring brake delivery port 716 to an exhaust port (not shown). The spring brakes 718 thus engage the wheels of a vehicle, thereby preventing the vehicle from rolling. Additionally, in the second operational state, service brake actuator/brake pedal 720 is actuated so that air in service brake line 722 is above a threshold pressure and the service brakes 724 engage the wheels (not shown) of the vehicle. The threshold pressure is selected so that the vehicle will not roll unexpectedly if the spring brakes 718 are released. Service pressure is also delivered to an input 726 of a control double check valve 728. With the check valve member 730 unseated from valve seat 734, the pressurized air at the control input 726 communicates with the second check valve region 742 and with a passage 744 between the second check valve region 742 and a third region 746 of an inlet valve 748. A force arising from pressure applied to the piston overcomes a force of a piston spring 752 so that the piston moves toward a fourth region 754 of the inlet valve. Valve guide 756 moves with the piston 750 and an inlet valve member 757 associated with the valve guide. Both the valve guide 756 and inlet valve member 757 are moved further into a fifth region 758 that communicates with an inlet valve supply port 759. The fourth region 754 communicates with an inlet valve outlet port 760. As a result of movement of the inlet valve member from an inlet valve seat 762, a communication path is opened between the fourth and fifth inlet valve regions. Pressurized air delivered to the inlet valve inlet port 759 is communicated to the fourth region 754 by the communication path that was opened when the inlet valve member 757 was lifted off the inlet valve seat 762. As described above, the inlet valve outlet port 760 communicates with the fourth region 754. Therefore, the inlet valve outlet port 760 also receives pressurized air which is made available to a tractor spring brake control valve inlet port 770 through an inlet valve output conduit 771. If the tractor valve button 710 and associated plunger 712 were actuated, the tractor spring brake control valve would deliver pressurized air to the spring brakes 718.

Figure 4A:
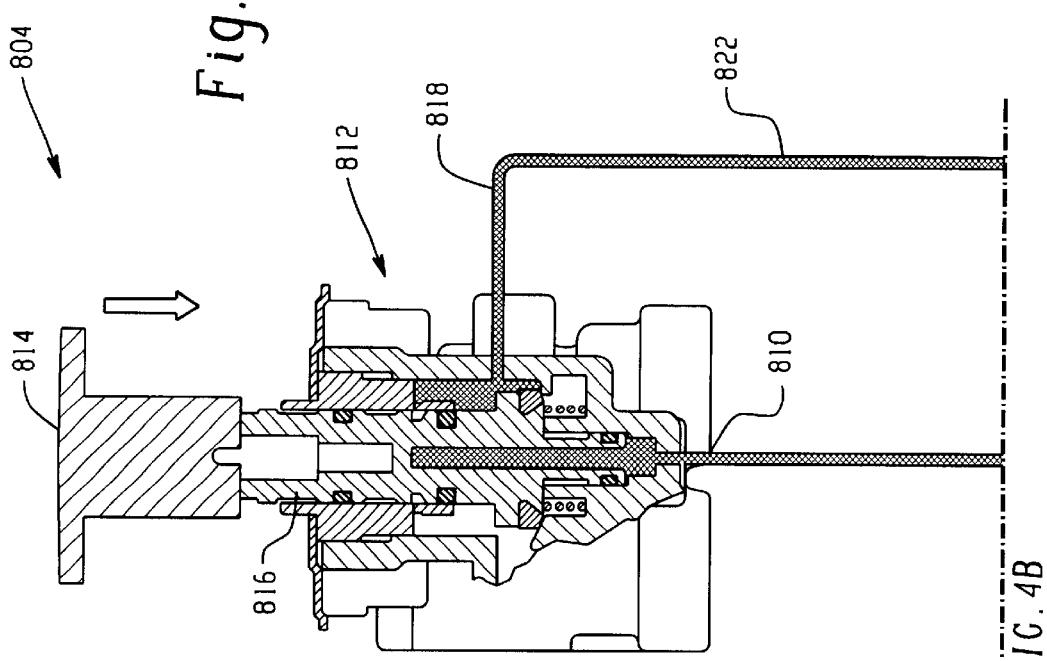
FIGS. 4A and 4B are a diagram showing the valve assembly of FIGS. 2A and 2B in a third operational state.
Figure 4A:
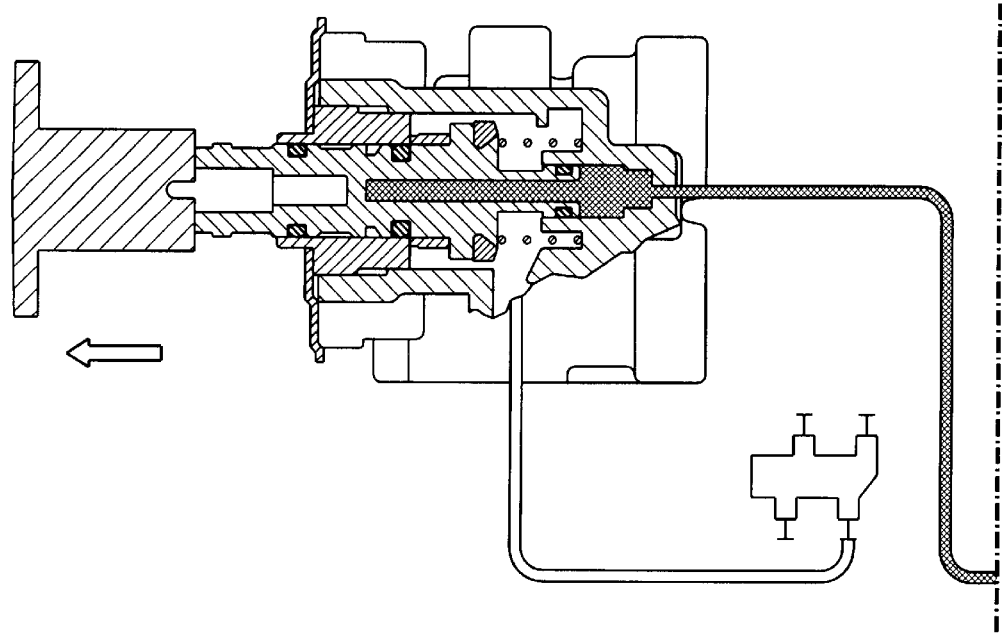
Figure 4B:
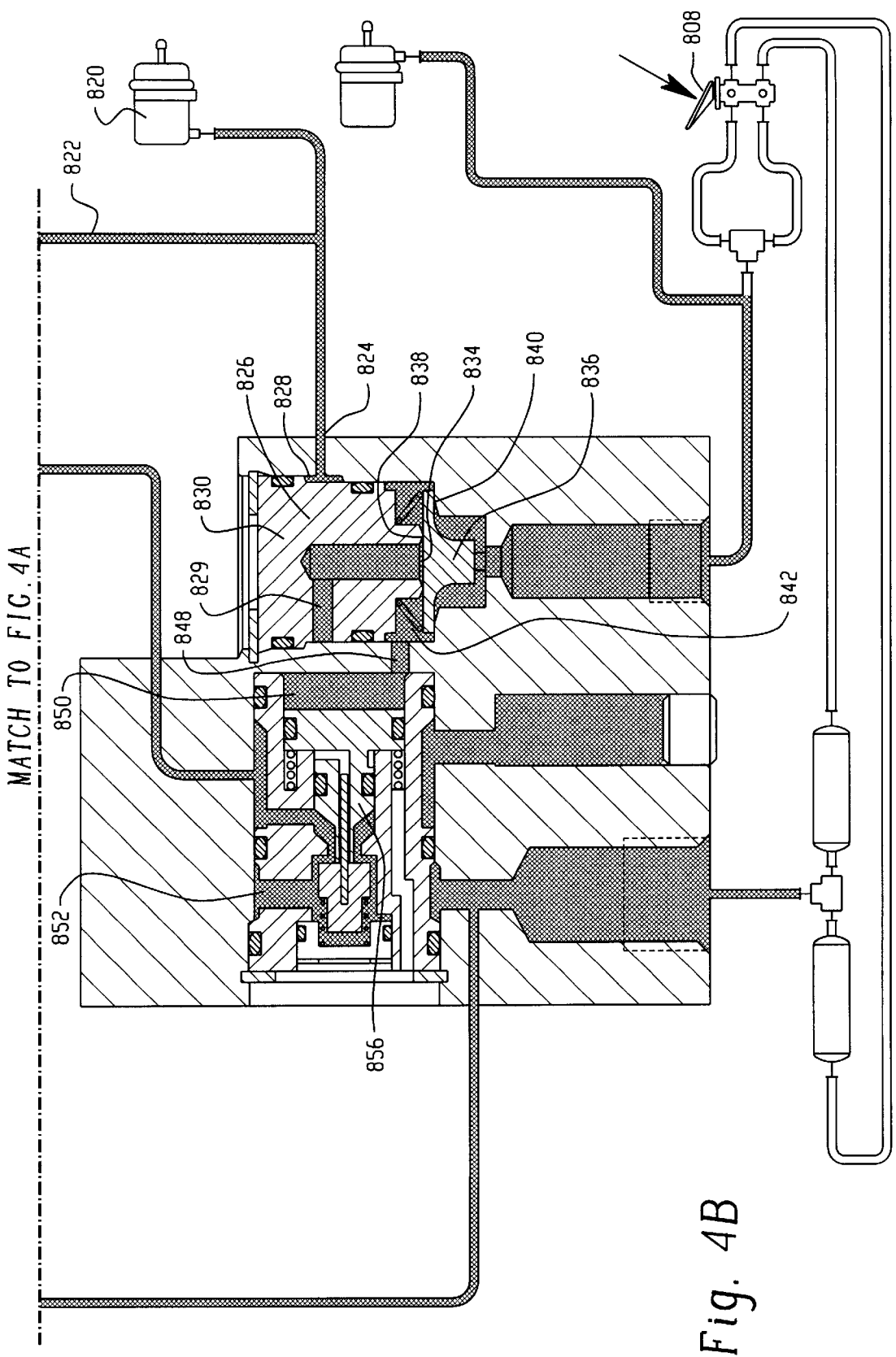

Referring to FIGS. 4A and 4B, the valve assembly (now referenced as numeral 804) is shown in a third operational state. In the third operational state, the service brake pedal 808 has been actuated beyond a threshold degree so that supply pressure is available at a tractor valve inlet port 810 of a tractor spring brake control valve 812. However, in the third state, tractor valve button 814 and a tractor valve plunger 816 are actuated. As is explained in greater detail in the U.S. Pat. No. 4,844,553 to Bliss, previously incorporated by reference, depressing the valve button 814 and plunger 816 directs pressurized air available at the inlet port 810 to a tractor spring brake control valve delivery port 818 and to spring brakes 820 through a spring brake line 822, thereby releasing the spring brakes. A branch of the spring brake line also delivers pressurized air to a lockout port 824 of a control double check valve 826. The lockout port 824 communicates with a first region 828 of the control double check valve 826. A passage 829 in spacer 830 conducts pressurized air in the first region 828 to a second region 834 of the passage 828, urging check valve member 836 away from a first check valve seat 838 and against a second check valve seat 840.

The pressurized air in the passage 829 acting downwardly (relative to the FIGURE) on the check valve member 836 is higher than or equal to a pressure of pressurized air acting upwardly (relative to the FIGURE) on the check valve member 836 and, therefore, the check valve member is pressed against the second seating surface 840 thereby sealing off the control input. The check valve member 836 is moved away from the first seating surface and pressurized air flows through the passage into a third region 842 of the control double check valve and into a second passage 848 that communicates with a fourth region 850 of an inlet valve 852. This provides a force acting on piston 856 of the inlet valve 852 and, in this way, spring brake line pressure 822 delivered to the lockout port 824 latches the inlet valve 852 in an open position independent of the degree of actuation of the service brake actuator 808. This allows the spring brakes to be maintained in their released state after a vehicle operator, for example, removes his foot from a service brake pedal 808.

Figure 5B:
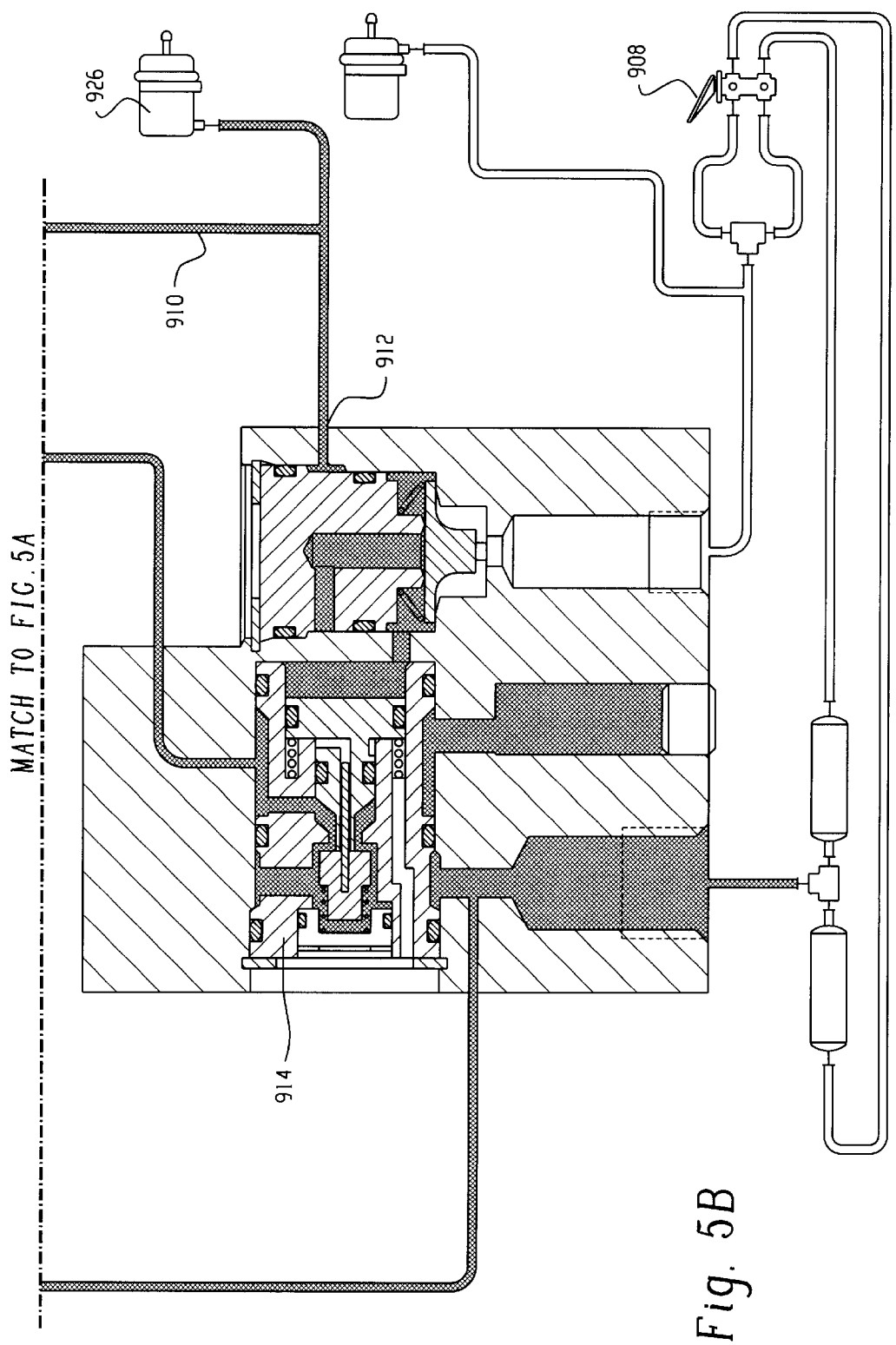

Referring to FIGS. 5A and 5B, the valve assembly 904 is in a fourth operational state. The fourth operational state is similar to the third operational state of FIGS. 4A and 4B, however, the service brake pedal 908 is not actuated. Nevertheless, pressure in spring brake line 910 is delivered to a lockout port 912 and serves to hold an inlet valve 914 in an open position. Therefore supply pressure continues to be delivered to a tractor spring brake control valve inlet 916 of a tractor spring brake control valve 918. A Plunger 920 and button 922 of the tractor spring brake control valve 918 are maintained in a depressed position (relative to the FIGURE). For example, internal to the tractor spring brake control valve 918 the pressure of the air applied to the inlet 916 overcomes the force generated by a tractor valve return spring 924 and holds the plunger 920 in the depressed position. Therefore, supply pressure continues to be delivered to the spring brake line 910, spring brakes 926 and the lockout port 912. Additionally a trailer supply valve 940 has also been depressed. Supply pressure delivered to a trailer supply valve inlet 942 holds a plunger 944 of the trailer supply valve 940 in the depressed position. The trailer supply valve 940 delivers supply pressure to trailer systems, including, for example, trailer spring brakes (not shown). Preferably, a tractor protection valve 946 is included between the trailer supply valve and the trailer. With pressure supplied to the trailer, parking brakes of the trailer are released and the combination vehicle (tractor and trailer) can be driven to its destination.

Figure 6A:
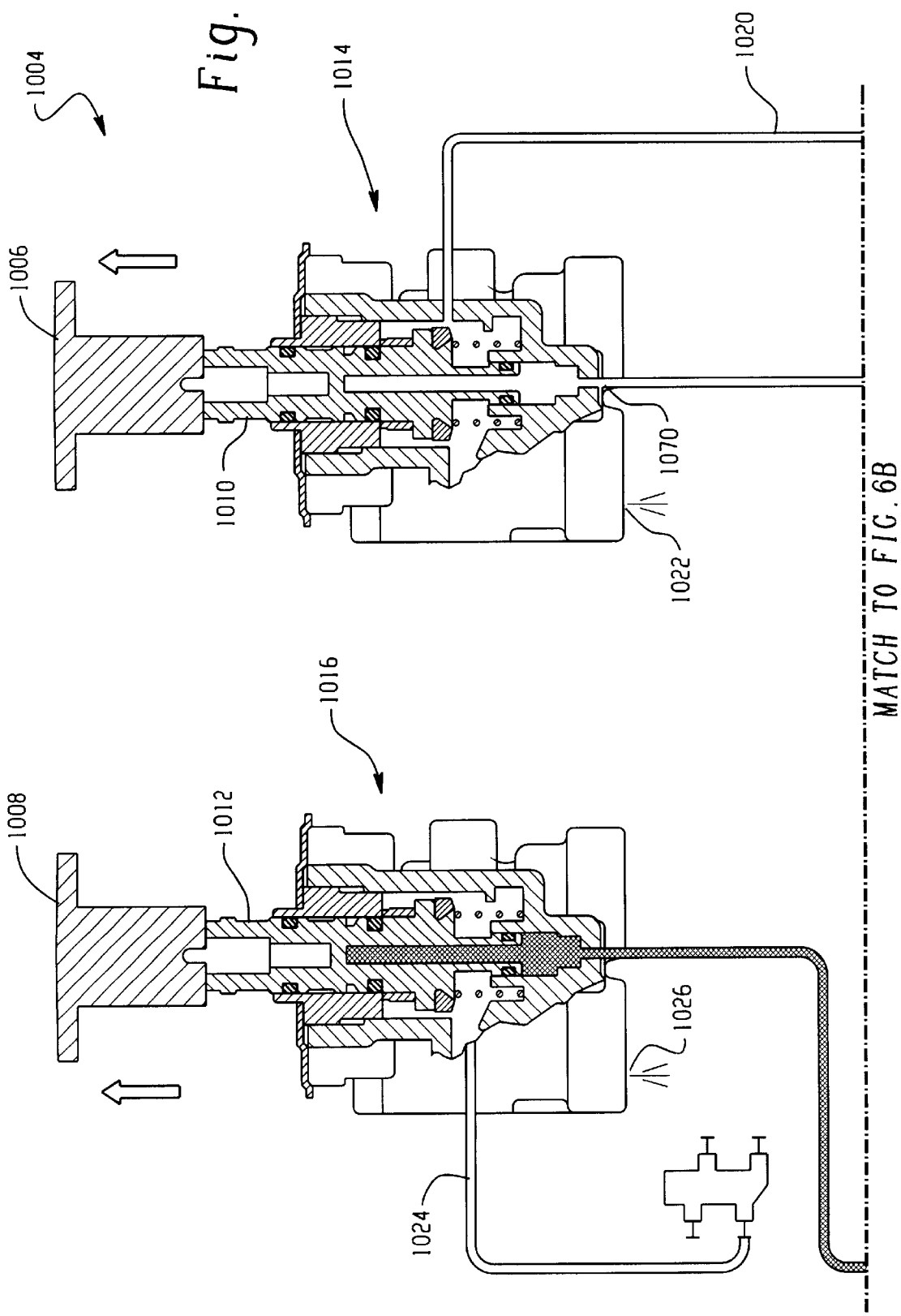
FIGS. 6A and 6B are a diagram showing the valve assembly of FIGS. 2A and 2B in a fifth operational state.
Figure 6B:
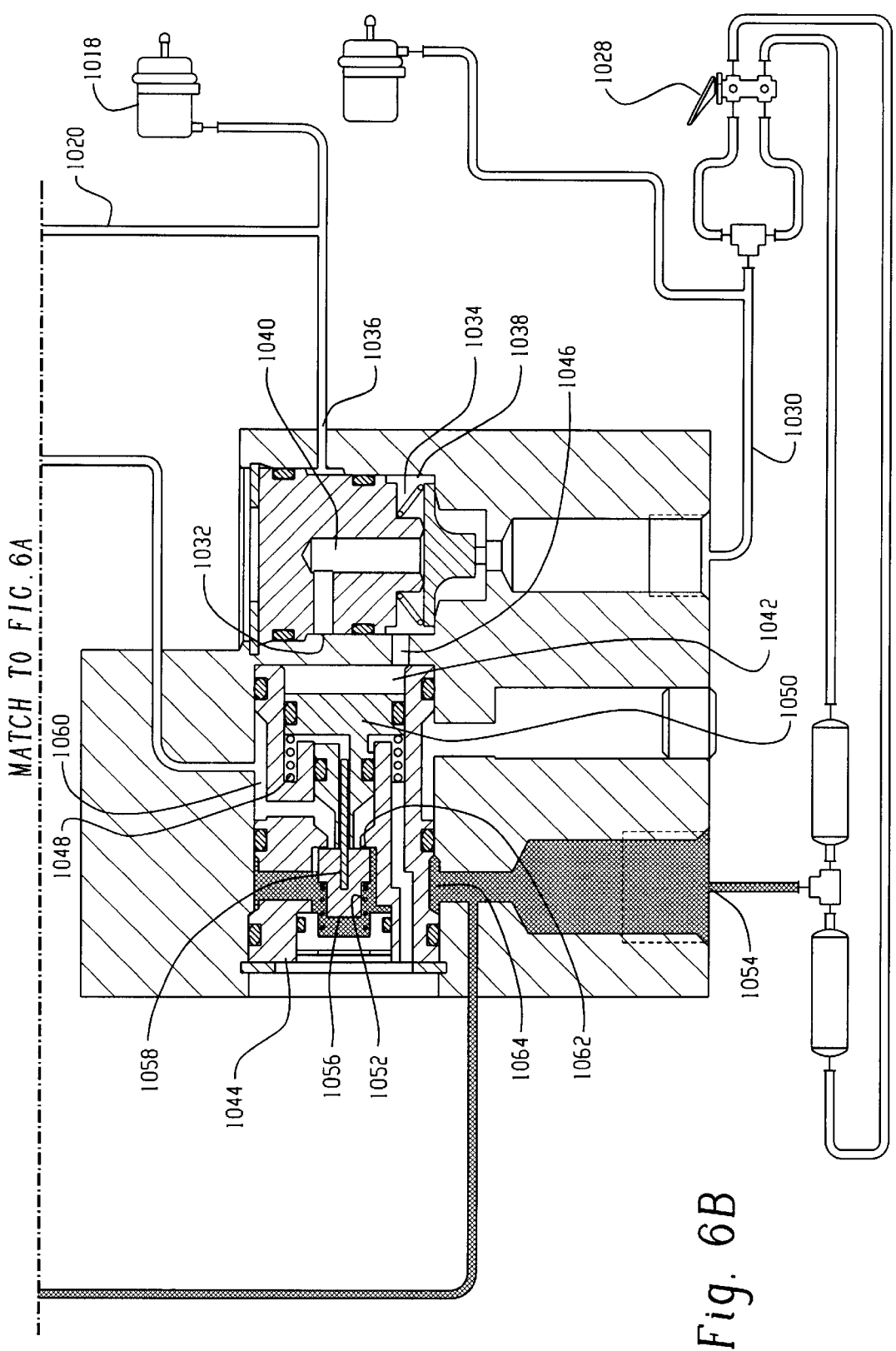

Referring to FIGS. 6A and 6B, the valve assembly is shown in a fifth operational state which is actually a transition from the fourth operational state to the first operational state. In the fifth operational state plunger buttons 1006, 1008 and plungers 1010, 1012 of the tractor spring brake control valve 1014 and a trailer supply valve 1016 have been deactuated (i.e., lifted). Therefore the valves 1014, 1016 are in an exhaust position where pressurized air from spring brakes 1018 and spring brake line 1020 is vented through a tractor spring brake control valve exhaust port 1022. Likewise, pressurized air from a trailer system (not shown) and trailer supply line 1024 is vented through a trailer supply valve exhaust port 1026.

Additionally, in the fifth operational state, a service brake actuator 1028 is not actuated so that air pressure in service brake line 1030 is zero. For example, the pressure of air in the service brake line is below a threshold thereby indicating that the service brakes are not engaged sufficiently to prevent the vehicle from rolling unexpectedly. As the spring brakes 1018 and spring brake line 1020 are vented, pressurized air in a first region 1032 of a control double check valve 1034 flows from a lockout port 1036 of the control double check valve 1034 and into the spring brake line 1020 to be vented to atmosphere. As air leaves the first region 1032, air in a second region 1038 of the control double check valve 1034 flows through a first passage 1040 into the first region 1032 and out the lockout port 1036. Therefore, a pressure in the second region 1038 is reduced. Similarly, air in a third region 1042 of an inlet valve assembly 1044 flows through a second passage 1046 into the second region 1038 and eventually out the lockout port 1036. As pressurized air leaves the third region 1042, a piston spring or resilient member 1048 is able to urge a piston 1050 of the inlet valve assembly 1044 toward the third region 1042. As the piston 1050 moves toward the third region 1042, forces from an inlet valve member return spring 1052 and/or pressurized air supplied from an inlet port 1054 of the inlet valve assembly 1044 urge an inlet valve member 1056 and an associated valve 1058 guide toward and further into a fourth region 1060 of the inlet valve assembly 1044, respectively. Ultimately, the inlet valve member 1056 is seated on an inlet valve seat 1062 thereby preventing communication between the fifth region 1064 and the fourth region 1060. Therefore, no significant amount of pressurized air is available to the tractor spring brake valve inlet port 1070. When substantially all the pressurized air has been vented or returned to a low pressure tank or reservoir, the transition is complete and the fifth valve assembly 1004 is in the first operational state.

Figure 7:
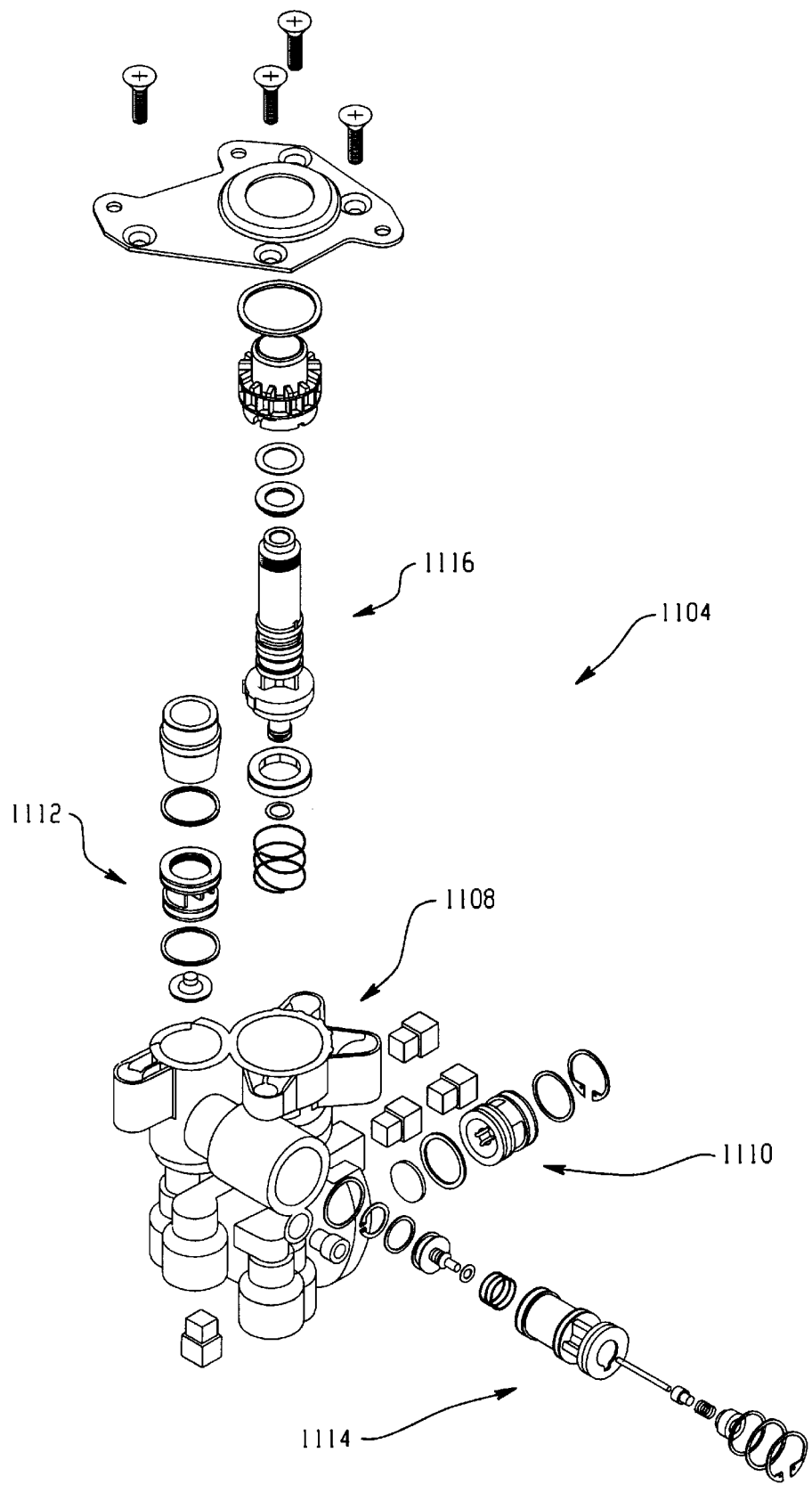
FIG. 7 is an exploded view of second valve assembly configured as a braking system control block operative to require a two-step brake release process.

Referring to FIG. 7, a second embodiment 1104 includes a molded housing 1108 for integrating many of the elements of the first embodiment into a single package. The housing 1108 of the second embodiment 1104 houses and provides chambers and interconnecting passages for components of a supply selector double check valve 1110, a control double check valve 1112, and inlet valve 1114, and a tractor spring brake control valve 1116.

Figure 8:
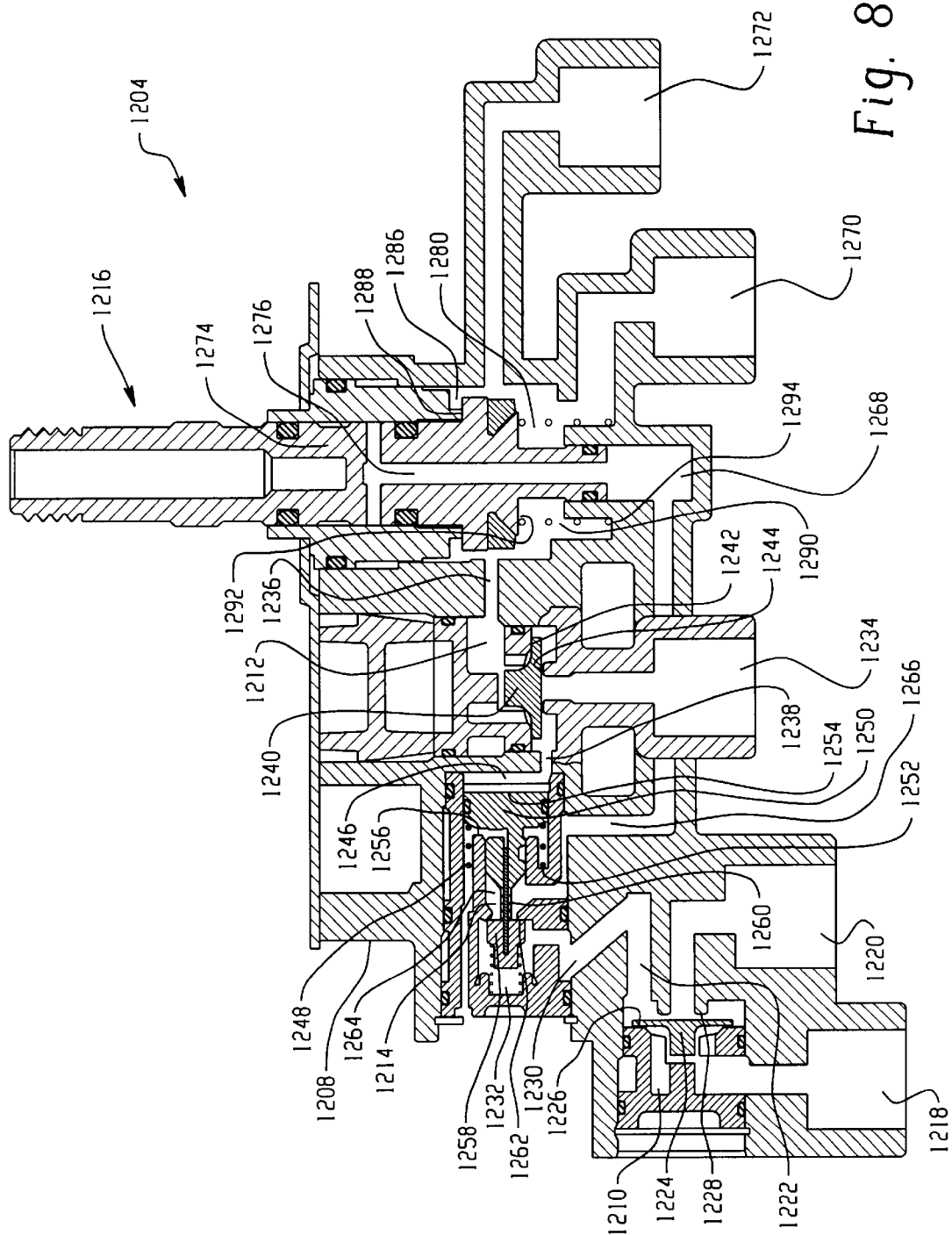
FIG. 8 is a functional diagram of the valve assembly of FIG. 7.

The function and interconnections of the second embodiment are schematically illustrated in FIG. 8. Housing 1208 contains a source selection double check valve 1210, a control double check valve 1212, an inlet valve assembly 1214 and a tractor spring brake control valve 1216. The source selection check valve 1210 includes a primary supply input port 1218, a secondary supply input port 1220 and a selected source output passage 1222. In operation a pressure difference between a primary and secondary pressurized air source forces a selection valve member 1224 against a first valve seat 1226 or a second valve seat 1228 thereby directing the higher pressure source to the selected source output passage 1222. Optionally, the selection valve 1210 is biased to favor one of the supplies. For example, an area on the primary supply side of the check valve member 1224 is greater than an area on the secondary supply side of the check valve member 1224.

The selected source output passage merges into an input port 1230 of the inlet valve assembly 1214. In the nomenclature of the earlier discussion, the input port 1230 communicates with a fifth region 1232 of the inlet valve. The control double check valve 1212 includes a control input port 1234, a lockout passage 1236, and a control double check valve output passage 1238. In operation a pressure difference between the control input port 1234 and lockout passage 1236 forces a control double check valve member 1240 against a first seat 1242 or a second seat 1244 thereby directing the higher pressure source (1234 or 1236) to the control double check valve output passage 1238. The control double check valve output passage 1238 merges into a third control port 1246 of the inlet valve assembly 1214. Of course, the control double check valve member 1240 may be biased to favor, for example, air pressure from the lockout passage 1236, in a manner similar to that described in relation to the source selector check valve 1210.

The inlet valve assembly 1214 includes a piston spring 1248 and a piston 1250. The piston spring 1248 is mounted between a piston spring support 1252 and head 1254 of the piston 1250. The piston port delivers pressurized air to a side of the piston head 1254 opposite the side that is in contact with the piston spring 1248. In operation, if the pressurized air delivered to the piston port 1246 is above a threshold level, and therefore sufficient to overcome a spring force of the piston spring 1248, then the piston 1250 is driven toward the left (relative to the FIGURE) until the piston comes into contact with a piston stop 1256. This movement drives an inlet valve member 1258 and valve guide 1260 from the position shown in the figure, wherein the inlet valve member is seated on an inlet valve seat 1262, to a position to the left (relative to the figure) of the shown position. In the seated position, a fourth inlet valve region 1264 is isolated from the fifth region 1232. The inlet valve member 1258 blocks the only passage between the fourth and fifth regions. When the piston 1250, valve guide, and inlet valve member are displaced to the left (relative to the figure), the inlet valve member is moved away from the inlet valve seat 1262 so that pressurized air flows from the fifth region 1232 to the fourth region 1264 that communicates with an inlet valve output passage 1266. The inlet valve output passage merges into a tractor valve input port 1268 of the tractor spring brake control valve 1216.

The tractor spring brake control valve 1216 further includes an exhaust port 1270 and a spring brake delivery port 1272. As illustrated in FIG. 8 a tractor valve plunger 1274 of the tractor spring brake control valve 1216 is in an upward or exhaust position. Pressurized air present at the spring brake delivery port 1272 and/or the lockout passage 1236 associated with the third region or piston port 1246 of the inlet valve assembly 1214 is directed through a sixth region 1280 of the tractor spring brake control valve to the exhaust port 1270.

If the tractor valve plunger 1274 is actuated, then the top of the plunger passage 1276 is placed in communication with a seventh region 1286 of the tractor spring brake control valve 1216. Furthermore, in the actuated position, the lockout passage 1236 and the spring brake delivery port 1272 are placed in communication with the seventh region 1286. Therefore, pressurized air delivered to the seventh region 1286 through the plunger passage 1276 fills the seventh region 1286 and reaches lockout passage 1236 and the spring brake delivery port 1272. Pressurized air delivered through the lockout passage 1236 forces the control double check valve member 1240 against valve seat 1244 and also pressurizes the third region 1246 of the inlet valve. This maintains the piston 1250 in a leftmost position and locks the inlet valve assembly 1214 in an open position. Pressurized air delivered through the spring brake delivery port 1272 is preferably conducted to the spring brakes through, for example, a spring brake line (not shown). Thus, the pressurized air releases the spring brakes on the vehicle wheels (not shown). Pressurized air remaining in the seventh region 1286 applies a force on a radially projecting section 1288 of the plunger 1274. This force overcomes a lifting force imposed by tractor valve spring 1290 compressed between an under side 1292 of the radially projecting section and a tractor valve spring support portion 1294 of the housing. Therefore, the plunger 1274 is held in the depressed, spring brake releasing position until an operator manually lifts the plunger or pressures of both the primary and secondary supplies drop below a pressure sufficient to counteract the force of the tractor valve spring 1290.

Figure 9:
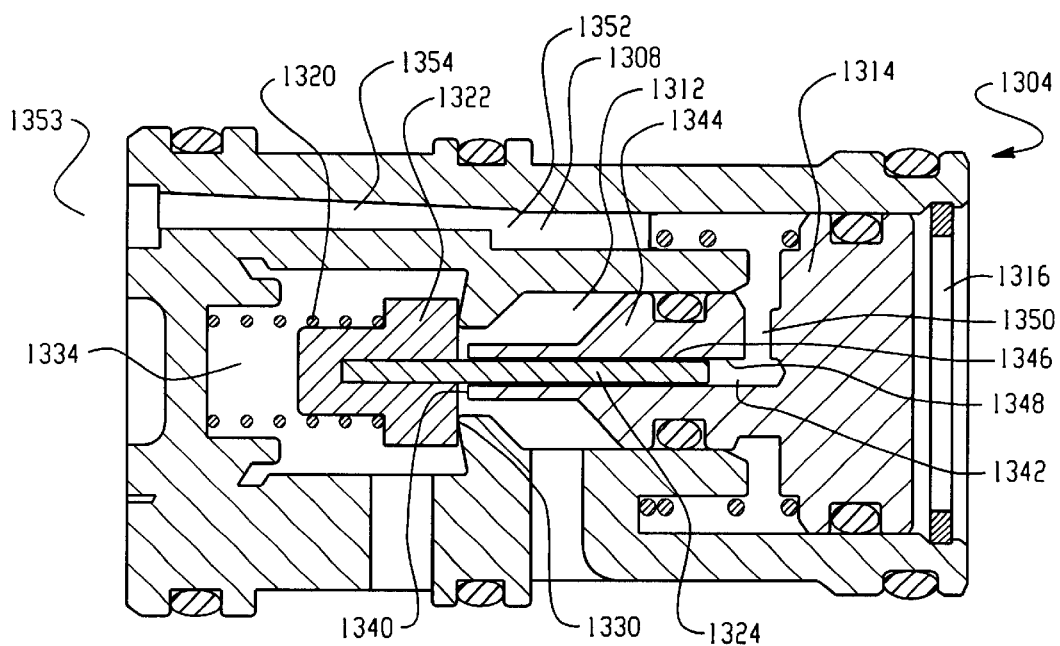
FIG. 9 is a functional diagram of an inlet valve shown in a first operational state.

Referring to FIG. 9, a closed inlet valve assembly 1304 preferably includes a venting means 1308 operative to vent air from a fourth region 1312 of the closed inlet valve assembly 1304. A piston 1314 is positioned in a right-most piston position so that a third region 1316 of the inlet valve assembly 1304 is at a minimum size. An inlet valve member return spring 1320 urges an inlet valve member 1322 and a valve guide 1324 into a right-most position. The inlet valve member 1322 is seated on valve seat 1330. Therefore, communication between a fifth region 1334 and the fourth region 1312 of the inlet valve assembly 1304 is prevented. Typically, the inlet valve assembly 1304 assumes the closed state when an operator of a vehicle switches the tractor spring brake control valve 160, 684, 1216 from a spring brake release state into a spring brake exhaust state. This operation tends to trap pressurized air in the fourth region 1312 of the inlet valve assembly 1304 and in an inlet valve output conduit or passage 162, 696, 1266 (see FIGS. 1, 2A, 2B and 8).

This trapped air can affect the operation, sound and feel of the tractor spring brake control valve when the operator next attempts to release the spring brakes. For example, as the tractor spring brake control valve is moved from the exhaust state to the spring brake release state, trapped air would flow from the fourth region 1312 and associated passages into the spring brake line. As the air is delivered, an audible sound is emitted even if the primary and secondary pressure reservoirs are empty. In this case, the sound may confuse the operator into believing the spring brakes are released, when, in fact, they are still engaged. Additionally, the trapped air resists the operator's actuation of the tractor spring brake control valve. For example, the operator must compress the trapped air in order to move the tractor spring brake control valve into the spring brake release state. For the forgoing reasons, the inlet valve assembly 1304 preferably includes the venting means 1308.

For example, the venting means includes a vent seat 1340. The vent seat 1340 is operative to receive the inlet valve member 1322 when the inlet valve is in an open state. However, in the illustrated closed state, the inlet valve member 1322 is not seated on the vent seat 1340. When the piston 1314 is in the illustrated right-most position, the inlet valve seat 1330 serves to separate the inlet valve member 1322 from the vent seat 1340. The vent seat 1340 is at an inlet valve member end of an axial bore 1342 in a shaft portion 1344 of the piston 1314. The bore 1342 is operative to slidably receive the valve guide 1324. Additionally, a gap 1346 between the valve guide 1324 and a wall 1348 of the bore is operative as a first portion of a piston vent passage 1350 in the piston 1314. When the inlet valve assembly 1304 is in the illustrated closed state, the vent seat 1340 is positioned in the fourth region 1312. The piston vent passage 1350 is in communication with a frame vent passage 1352. The frame vent passage 1352 communicates with a vent region 1353, e.g., atmosphere.

When the inlet valve member 1322 is not seated on the vent seat, as shown in FIG. 9, the fourth region 1312 is in communication with the piston vent passage 1342 through the open vent seat 1340, the piston vent passage 1350, and in turn with the frame vent passage 1354 and the vent region 1353. When the inlet valve assembly 1304 is in the closed state, the venting means 1308 is in an open state. Therefore, air that would otherwise be trapped in the fourth region 1312 and associated passages when the inlet valve is closed is instead vented. Of course, the venting means 1308 must be sealed or closed when the inlet valve assembly 1304 is in an opened state.

Figure 10:
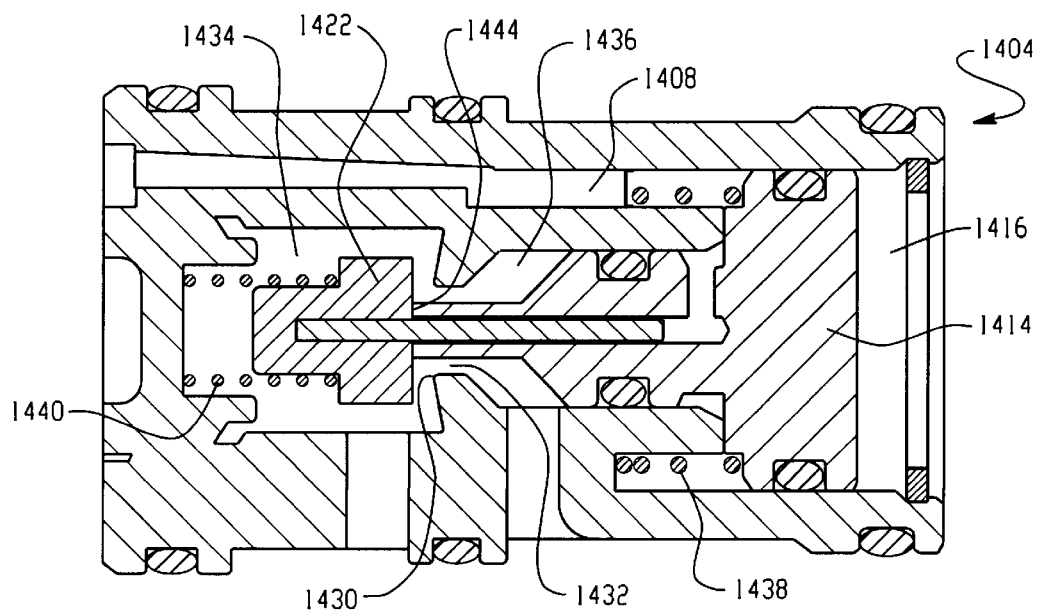
FIG. 10 is a functional diagram of the inlet valve of FIG. 9 in a second operational state.

Referring to FIG. 10, an open inlet valve assembly 1404 includes a sealed venting means 1408. A piston 1414 is positioned so that a third region 1416 of the inlet valve assembly 1404 is at a maximum size. Inlet valve member 1422 is unseated from inlet valve seat 1430 to form a communication path 1432 between fourth region 1436 and fifth region 1434. Typically, the inlet valve assembly 1404 is urged toward an open state when an operator of a vehicle actuates a service brake actuator 154, 683 in preparation to release parking spring brakes of a vehicle. This delivers pressurized air to the third region 1416 of the inlet valve assembly 1404 and drives the piston 1414 to the illustrated left-most position. As a result, the inlet valve member is urged against a vent seat 1444 portion of the piston 1414. Additionally, pressurized air in the fifth region 1434 also urges the inlet valve member against the vent seat 1444. Therefore, pressurized air is prevented from leaking out through the venting means 1408 while the inlet valve assembly 1404 is in the open state.

Referring to FIG. 11, the inlet valve assembly 1304, 1404 of FIGS. 9 and 10 may be included in any of the valve assembly embodiments described herein. The third valve assembly 1504 includes in a single housing 1508, a tractor spring brake control valve 1510, a trailer supply valve 1512, a supply selector 1514, a control double check valve 1516, an inlet valve 1518, a tripper valve 1519, and an exhaust check valve 1520. The tripper valve 1519 prevents an operator from overriding an auto-exhaust feature of the trailer supply valve 1512.

As described previously, the supply selector 1514 communicates with a primary and secondary supply input ports 1521, 1522. Typically the primary and secondary supply ports are connected to primary and secondary pressurized air reservoirs (not shown). A selector check valve member 1524 of the supply selector 1514 moves to direct one of the primary and secondary supplies to a supply passage 1525. For example, the supply delivering pressurized air at the highest pressure is directed to the supply passage 1525.

The supply passage 1525 delivers pressurized air to an inlet or fifth region 1526 of the inlet valve 1518. Additionally, the supply passage 1525 delivers pressurized air to an inlet 1528 of the trailer supply valve 1512.

The control double check valve 1516 communicates with a control input port 1530, a control check valve output passage 1531 and a lockout passage 1532. As previously described, in a first mode of operation, a control check valve member 1533 within the control double check valve 1516 moves to direct one of pressurized air delivered to the control input port 1530 and pressurized air delivered to the lockout passage 1532 to the control check valve output passage 1531. For example, the port 1530 or passage 1532 carrying pressurized air at the highest pressure is directed to the control check valve output passage 1531. In a second mode of operation, pressurized air in the control check valve output passage 1531 is vented through the lockout passage 1532. The control check valve output passage 1531 merges into a third, or actuation region or piston, or control port 1534 of the inlet valve 1518. The lockout passage 1532 is in communication with a seventh region 1536 of the tractor spring brake control valve 1510.

The tractor spring brake control valve 1510 communicates with other devices through with a tractor valve input port 1538, a spring brake delivery port 1540, and a first exhaust passage 1542. The tractor valve input port 1538 receives pressurized air from a fourth inlet valve region 1544 through an inlet valve output passage 1546. Of course, the tractor valve input port 1538 only receives pressurized air when the inlet valve 1518 is open. Of course, as previously described in reference to other figures, the inlet valve 1518 is only open when pressurized air directed to the third region or piston port 1534 by the control double check valve 1516 from the control port 1530 or the lockout passage 1532 are of sufficient pressure to hold the inlet valve 1518 open.

When the tractor spring brake control valve 1510 is pulled upward (relative to the figure) into an exhaust state, as depicted in FIG. 11, any pressurized air delivered to the tractor valve input port 1538 will pressurize a tractor valve plunger passage 1548. However, the pressurized air from the tractor valve input port 1538 can travel no further, since distal ends 1550 of the plunger passage 1548 are isolated by plunger seals 1551 from any other region or passage. Additionally, when the tractor spring brake control valve 1510 is in the illustrated exhaust state, air in the lockout passage 1532 and the spring brake delivery port 1540 are placed in communication with, and flow out through, the first exhaust passage 1542 through an eighth region 1552 of the tractor spring brake control valve 1510.

When the tractor spring brake control valve 1510 is pushed downward (relative to the figure) into a delivery state, the distal ends 1550 of the plunger passage are placed in communication with the seventh region 1536 of the tractor spring brake control valve 1510. Therefore, pressurized air delivered to the tractor valve input port 1538 is placed in communication with the lockout passage 1532 and with the spring brake delivery port 1540. Pressurized air in the seventh region 1536 works on a tractor valve seal 1556. The pressurized air provides a force that overcomes a spring force of a tractor valve spring 1554. Therefore, when the tractor spring brake control valve 1510 is placed in the delivery state and the seventh region is filled with pressurized air, the pressurized air serves to hold or latch the tractor spring brake control valve 1510 in the delivery state. In the depressed position (not shown), or deliver state the tractor valve seal 1556 is seated on a tractor valve seat 1557. In this position the tractor valve seal 1556 prevents communication between the first exhaust passage 1542 and the seventh 1536 or eighth 1552 tractor valve regions.

The trailer supply valve 1512 operates in a similar manner. The trailer supply valve 1512 communicates with other devices through a trailer valve input port 1528, a trailer delivery port 1562, a tripper valve passage 1563, a reset passage 1564 or sampling point and, through the reset passage with an exhaust port 1565. As mentioned above, the trailer valve input port 1528 receives pressurized air from the supply passage 1525.

When the trailer supply valve 1512 is pulled upward (relative to the figure), into an exhaust state, as depicted in FIG. 11, any pressurized air delivered to the trailer valve input port 1528 pressurizes a trailer valve plunger passage 1566. However, the pressurized air from the trailer valve input port 1560 can travel no further since distal ends 1567 of the plunger passage 1566 are isolated by plunger seals 1568 from any other region or passage. Additionally, when the trailer supply 1512 is in the illustrated exhaust state, air in the trailer delivery port 1562, and tripper valve passage 1563, pass through a tenth region 1570 of the trailer supply valve 1512 pass through the trailer supply valve reset passage 1564 and vent or exhaust through the exhaust port 1565.

When the trailer supply valve 1512 is pushed downward (relative to the figure) into a delivery state, the distal ends 1567 of the plunger passage 1566 are placed in communication with a ninth region 1572 of the trailer supply valve 1512. Therefore, pressurized air delivered to the trailer valve input port 1528 is placed in communication with the tripper passage 1563 and with the trailer delivery port 1562. Pressurized air in the ninth region 1572 works on trailer valve seal 1576, providing a force that overcomes a spring force of a trailer valve spring 1575. Therefore the trailer supply valve 1512 is held or latched in a depressed or delivery state. In the delivery state (not shown) a trailer valve seal 1576 is seated on a trailer valve seat 1577. In this position the trailer valve seal 1576 prevents communication between the trailer supply valve reset passage 1564 and the ninth 1572 or tenth 1570 tractor valve regions.

Of course, pressurized air delivered to the trailer delivery port 1562 flows out of the valve assembly. Typically the trailer system (not shown) is connected to the trailer delivery port 1562. Therefore, when the trailer valve plunger is in the depressed position pressurized air flows from the supply selector 1514, through the supply passage 1525, through the trailer plunger passage 1566 into the ninth region 1572, out the trailer delivery port 1562 and into the trailer system.

Additionally, pressurized air flows from the ninth region 1572 into the tripper passage 1563. Pressurized air from the tripper passage 1563 flows into a twelfth 1578 and a thirteenth 1579 region of the tripper valve 1519. At nominal operating pressures, a force generated by pressurized airs in the thirteenth region 1579 drives a tripper valve plunger 1580 downward (relative to the figure) in opposition to the urging of a tripper valve spring 1582 or resilient member. The tripper valve plunger 1580 is driven downward so that a tripper valve seal 1584 sealing engages a narrowed portion 1586 of a tripper valve chamber wall, thereby cutting off communication between the twelfth region 1578 and the exhaust port 1565. However, if the operating pressure should drop below a predetermined threshold, for example, due to a system leak, the force generated by air in the thirteenth region 1579 is reduced and the tripper valve spring 1582 is able to drive the tripper valve plunger upward (relative to the figure), into the position illustrated in the figure, thereby moving the tripper valve seal 1584 away from the narrowed portion 1586 of the tripper valve chamber wall and opening a communication path between the twelfth region 1578 and the exhaust port 1565. Therefore, if for example, a leak occurs and the primary and secondary supplies are unable to maintain a minimum threshold amount of pressure in the trailer system, the tripper valve will trip to ensure that the trailer parking brakes are applied regardless of the trailer plunger position.

Of course, at low system pressures, the force working on the trailer valve seal 1576 falls below a threshold and the trailer valve spring forces the trailer supply valve 1512 into the exhaust state, thereby applying the brakes of any attached trailer. However, regulations require the tripper valve 1519 feature in order to ensure that a vehicle operator cannot override this feature by manually holding the trailer supply valve in the delivery state.

In addition to the low pressure auto exhaust feature just described, the trailer supply valve 1512 can be also be automatically driven into the exhaust state by exhaust air from the tractor spring brake control valve 1510. When the tractor spring brake control valve 1510 is switched or moved into the exhaust state, pressurized air from a spring brake line (not shown) attached to the spring brake delivery port 1540 is directed to the first exhaust passage 1542 through the tractor spring brake control valve 1510. The first exhaust passage leads to the exhaust check valve 1520. The exhaust check valve 1520 includes an exhaust check valve member 1590 that is urged onto an exhaust check valve seat 1592 by an exhaust check valve spring 1594. Pressurized air in the first exhaust passage 1542 pushes up on the exhaust check valve member 1590. When a force exerted by the exhaust passage air exceeds a force delivered by the exhaust check valve spring 1594, the exhaust check valve member is lifted off the exhaust check valve seat 1592 and the pressurized airs flow through a second exhaust passage 1595 and out the exhaust port 1565. As the air flows toward the exhaust port 1565, reset port 1564 is also pressurized. If the trailer supply valve 1512 is in the delivery state when tractor spring brake control valve 1510 exhaust air pressurizes the reset port, then a force generated by the pressure in the reset port is added to a force delivered by the trailer valve spring 1575. The combined forces overcome the force generated by pressurized air in the tenth region 1570 applied to the trailer valve seal 1576. Therefore, the trailer supply valve 1512 is automatically switched into the exhaust state.

Of course, when the first exhaust passage 1542 does not contain pressurized air, the exhaust check valve member 1590 sits on the exhaust check valve seat 1592 and prevents air from the trailer supply valve 1512 from entering the first exhaust passage 1542.

The invention has been described with reference to particular embodiments. Modifications and alterations will occur to others upon reading and understanding this specification. It is intended that all such modifications and alterations are included insofar as they come within the scope of the appended claims or equivalents thereof.

What is claimed is:

1. A valve assembly for an air pressure system, comprising:

a double check valve, including a first inlet port, a locking pressure port and a first outlet port, being operative to place one of the first inlet port and the locking pressure port in communication with the first outlet port, and preventing communication between the first inlet port and the locking port, based on relative air pressures at the inlet and locking ports;

an inlet valve including a second inlet port, a second outlet port and a control port, the control port being in communication with the first outlet port, the inlet valve being operative to place the second inlet port in communication with the second outlet port when a pressure at the control port is above a threshold, an air pressure at the second outlet port controlling an operation of a park brake of a vehicle; and a first control valve including a third inlet port, a third outlet port, a first exhaust port and a control member, the third inlet port being in communication with the second outlet port, the valve operative to place the third outlet port in communication with one of the third inlet port and the first exhaust port, depending on a position of the control member.

2. The valve assembly of claim 1 wherein the third outlet port is in communication with the locking pressure port.

3. The valve assembly of claim 2 further comprising a housing, the housing including:

a double check valve chamber operative to accommodate the double check valve;

a inlet valve chamber operative to accommodate the inlet valve;

a control valve chamber operative to accommodate the first control valve;

a first passage operative to provide a communication path between the first outlet port and the control port;

a second passage operative to provide a communication path between the second outlet port and the third inlet port; and a third passage operative to provide a communication path between the third outlet port and the lockout port.

4. The valve assembly of claim 1 further comprising:

an exhaust conduit including an exhaust conduit inlet, an exhaust conduit outlet and a sampling point there between, the exhaust conduit inlet being in communication with the first exhaust port; and a second control valve including a fourth inlet port, a delivery port, a second exhaust port, a second control member and a reset port, the reset port being in communication with the exhaust conduit at the sampling point, the reset port being operative to receive pressurized exhaust air from the exhaust port and apply the pressurized exhaust air to components of the second control valve so as to urge the second control valve from a delivery state to an exhaust state.

5. The valve assembly of claim 4 further comprising:

a check valve including a check valve inlet and a check valve outlet, the check valve installed in line with the exhaust conduit so that the pressurized exhaust air flows from the first exhaust port, into the check valve inlet, out the check valve outlet and cannot flow in the opposite direction.

6. The valve assembly of claim 4 further comprising:

a tripper valve in communication with the second delivery port and an exhaust port, the tripper valve operative to place the second delivery port in communication with the exhaust port when the pressure of air at the second delivery port is below a predetermined level.

7. The valve assembly of claim 4 further comprising a housing, the housing including:

a double check valve chamber operative to accommodate the double check valve;

a inlet valve chamber operative to accommodate the inlet valve;

a first control valve chamber operative to accommodate the first control valve;

a second control valve chamber operative to accommodate the second control valve;

a first passage operative to provide a communication path between the first outlet port and the control port;

a second passage operative to provide a communication path between the second outlet port and the third inlet port;

a third passage operative to provide a communication path between the third outlet port and the locking port;

a fourth passage operative as the exhaust conduit, thereby providing a communications path between the first exhaust port, the sampling point and the exhaust conduit outlet; and a fifth passage operative to provide a communication path between the sampling point and the reset port.

8. The valve assembly of claim 1 further comprising:

a proportional valve including a proportional outlet port, the proportional valve operative to deliver pressurized air at a selected pressure to the first inlet port through the proportional outlet.

9. The valve assembly of claim 1 wherein the inlet valve further comprises:

a valve frame including an inlet valve seat;

a valve guide;

an inlet valve member including a bore, an inlet valve seat engaging portion and an pressure relief seat engaging portion, the inlet valve member bore being operative to receive a first portion of the valve guide, the inlet valve seat engaging portion being operative to form a seal with the inlet valve seat, the pressure relief seat engaging portion being operative to form a seal with a pressure relief seat; and a piston slidably received within the valve frame, the piston including a piston head and a piston shaft, the piston head having a control port side and a shaft side, the shaft including an axial bore, the axial bore being operative to slidably receive a second portion of the valve guide and to act as an inlet valve pressure relief passage, the axial bore co-operating with the piston shaft to for the pressure relief seat.

10. A braking system control for a vehicle, the braking system including a service braking system and a parking braking system, the service braking system operative to reduce vehicle speed during normal vehicle movements, and the parking braking system operative to hold wheels of the vehicle in a fixed position while the vehicle is parked, the braking system control operative to prevent the parking braking system from releasing the wheels of the vehicle unless the service braking system is engaged, the braking system control comprising:

a pressure sensor;

a system pressure valve controlled by the pressure sensor to open when a sensed pressure is above a first threshold and to close when the sensed pressure is below a second threshold, the system pressure valve including a system pressure valve inlet and a system pressure valve outlet, the system pressure valve being operative to direct pressurized air delivered to the system pressure valve inlet to the service braking system through the system pressure valve outlet when the system pressure valve is open and to prevent pressurized air from reaching the parking braking system when the system pressure valve is closed; and a latching mechanism, operative to direct a higher one of a service braking system control pressure and a parking braking system releasing pressure to the pressure sensor.

11. The braking system of claim 10 further comprising:

a parking braking system operating mode selector including a mode selector input in communication with the system pressure valve outlet, a mode selector outlet in communication with parking braking system brakes, and an exhaust port, the operating mode selector selecting one of a parking brake releasing mode and a parking brake applying mode, in the parking brake releasing mode the operating mode selector placing the operating mode selector input in communication with the operating mode selector output thereby energizing an associated parking brake release mechanism with a parking braking system releasing pressure, in the parking brake applying mode the operating mode selector placing the mode selector output in communication with the exhaust port thereby releasing the parking brake release mechanism of brake releasing force.

12. The braking system of claim 10 wherein the pressure sensor further comprises:

a valve frame;

a piston slidably received within the valve frame, the piston including a piston head and a piston shaft, the piston head having a pressure sensing side and a shaft side;

a piston spring in operational relation with the piston such that piston movements affect spring forces applied to the piston, whereby changes in pressure sensed by the pressure sensing side of the piston head change in equilibrium position of the piston.

13. The braking system of claim 12 wherein the valve frame includes an inlet valve seat and the system pressure valve further comprises:

an inlet valve member in operational association with the piston, whereby the inlet valve member is brought into sealing engagement with, the inlet valve seat when the piston is in a first position and the inlet valve member is unseated when the piston is in a second position.

14. The braking system of claim 13 further comprises:

a valve guide;

wherein the inlet valve member further includes an valve member axial bore, and an pressure relief seat engaging portion and the piston shaft further includes an piston shaft axial bore, the valve member axial bore being operative to receive a first portion of the valve guide and the piston shaft axial bore being operative to slidably receive a second portion of the valve guide and to act as an inlet valve pressure relief passage, the piston shaft axial bore co-operating with the piston shaft to form a pressure relief seat, the pressure relief seat engaging portion of the inlet valve member being operative to form a seal with a pressure relief seat when the piston is in the second position and separated from the pressure relief seat when the piston is in the first position.

15. A braking system control for a vehicle, the braking system including a service braking system and a parking braking system, the service braking system operative to reduce vehicle speed during normal vehicle movements, and the parking braking system operative to hold wheels of the vehicle in a fixed position while the vehicle is parked, the braking system control operative to prevent the parking braking sub-system from releasing the wheels of the vehicle unless the service braking system is engaged, the braking system control comprising:

a braking system state sensor;

a system pressure director controlled by the braking system state sensor operative to deliver pressure to the parking braking system for releasing the wheels of the vehicle when the braking system state sensor senses that the braking system is in a first state, to maintain the delivery of energy while the braking system state sensor senses that the braking system is in a second state and to prevent the delivery of pressure to the parking braking system when the braking system state sensor senses that the braking system is in a third state; and a parking braking system operating mode selector including an mode selector input in communication with the an output of the system energy director, and a mode selector outlet in communication with parking braking system brakes, the parking braking operating mode selector selecting one of a parking brake release actuated mode and a parking brake release deactuated mode, the parking braking operating mode selector operative to deliver pressure received from the output of the system energy director to a parking brake release mechanism in the parking brake release actuated mode and operative to deprive the parking brake release mechanism of pressure in the secondary brake release deactuated mode.

16. A valve system for use in a vehicle, including:

a double check valve receiving respective air pressure signals at a service pressure port and a locking pressure port, the signal at the service pressure port representing an application of a service brake, the signal at the locking pressure port representing an application of a spring brake, and the service pressure signal being communicated to an outlet port of the check valve if both the service and spring brakes are applied; and an inlet valve having an inlet port, an outlet port, and a control port, the control port being in communication with the double check valve outlet port, the inlet valve being operative to place the inlet port in communication with the outlet port, for controlling an operation of the spring brake, as a function of a pressure at the control port.

17. The valve system as set forth in claim 16, wherein the inlet valve places the inlet port in communication with the outlet port when the pressure at the control port is above a threshold.

18. The valve system as set forth in claim 16, further including:
a first control valve including a supply port, a delivery port, an exhaust port, and a control member, the supply port communicating with the outlet port of the inlet valve, the delivery port communicating with the locking pressure port, and the delivery port communicating with one of the supply port and the exhaust port as a function of a position of the control member.

19. The valve system as set forth in claim 18, wherein:
the delivery port communicates with the exhaust port when the control member is in a first position for applying the spring brake; and
the delivery port communicates with the supply port when the control member is in a second position for releasing the spring brake.

20. The valve system as set forth in claim 18, wherein:
an air pressure at the inlet port of the inlet valve is communicated to the outlet port of the inlet valve and the supply port if both the service and spring brakes are applied; and
if the control member is positioned for releasing the spring brake, the air pressure received at the supply port from the outlet port of the inlet valve is communicated to the delivery port and then to the spring brake for releasing the spring brake.

21. The valve system as set forth in claim 18, further including:
a second control valve for controlling a second spring brake, the second control valve including a reset port communicating with the exhaust port of the first control valve, pressurized air exhausted from the exhaust port of the first control valve and received by the reset port causing the second control valve to exhaust air from the second spring brake for releasing the second spring brake.

22. A method for controlling pressure to a vehicle spring brake via a valve system, the method comprising:
applying a service brake for supplying a pressure to an actuating port of an inlet valve;
if the pressure applied to the actuating port is above a threshold pressure;
communicating air pressure from an inlet port of the inlet valve to an outlet port of the inlet valve;
communicating the air pressure from the outlet port to a supply port of a control valve; and
if a control member is in a release position, communicating the air pressure from the supply port to a delivery port and the spring brake for releasing the spring brake.

23. The method for controlling pressure to a vehicle spring brake as set forth in claim 22, further including:
placing the control member in an apply position for exhausting air pressure from the spring brake and causing the spring brake to be applied.

24. The method for controlling pressure to a vehicle spring brake as set forth in claim 23, further including:
communicating the exhausted air pressure from the spring brake to a reset port of a second control valve for causing the second control valve to exhaust air from a second spring brake for releasing the second spring brake.

25. The method for controlling pressure to a vehicle spring brake as set forth in claim 22, wherein the applying includes:
applying pressure to a service brake pedal.

26. The method for controlling pressure to a vehicle spring brake as set forth in claim 22, wherein the applying includes:
communicating the pressure from the service brake to a first input of a double check valve;
communicating air pressure from the spring brake to a second input of the double check valve; and
if the pressure at the first input of the double check valve is higher than the pressure at the second input of the double check valve, communicating the pressure at the first input of the double check valve to the actuating port.

27. A vehicle park brake release valve assembly, comprising:
an inlet valve including an inlet port communicating with a source of pressurized air, an actuating pressure port receiving a control pressure which is set as a function of an engagement of a vehicle park brake and an engagement of a vehicle service brake, and an outlet port, the inlet port communicating with the outlet port as a function of the control pressure; and
a brake control valve including a supply port communicating with the outlet port of the inlet valve, the pressurized air being communicated from the source to the supply port via the inlet valve as a function of the control pressure, the park brake being enabled for release as a function of the pressurized air being communicated to the supply port.

28. The park brake release valve assembly as set forth in claim 27, wherein the inlet valve communicates the pressurized air from the source to the supply port of the brake control valve when at least one of: i) the park brake is disengaged; and ii) the service brake is engaged above a predetermined level.

29. The park brake release valve assembly as set forth in claim 28, wherein:
the brake control valve includes a control switch for setting the delivery port to communicate with one of the supply port, for releasing the park brake, and the exhaust port, for setting the park brake, the control switch being enabled to set the delivery port to communicate with the supply port when the pressurized air is communicated to the supply port.

30. The park brake release valve assembly as set forth in claim 27, further including:
a double check valve including a service pressure port communicating with the vehicle service brake, an outlet port communicating the control pressure to the actuating pressure port, and a locking pressure port communicating with the vehicle park brake;
wherein the brake control valve includes a control switch, an exhaust port, and a delivery port, which communicates with the vehicle park brake and the locking pressure port, the delivery port communicating with one of the supply port and the exhaust port as a function of a position of the control switch.

31. The park brake release valve assembly as set forth in claim 30, wherein:
the double check valve communicates a higher one of a first pressure of the vehicle service brake and a second pressure of the vehicle park brake as the control pressure to the actuating pressure port;
the inlet port communicates the pressurized air from the source to the outlet port and the supply port when the actuating pressure is above a predetermined level; and the pressurized air at the supply port is communicated to the vehicle park brake via the delivery port, for releasing the vehicle spring brake, when the control switch is positioned to communicate the supply port with the delivery port.

32. The park brake release valve assembly as set forth in claim 31, wherein:

the pressurized air is communicated as the control pressure to the actuating pressure port from the vehicle park brake and the locking pressure port for causing the pressurized air to be communicated from the source to the outlet port.

* * * * *

UNITED STATES PATENT AND TRADEMARK OFFICE
CERTIFICATE OF CORRECTION

PATENT NO.    : 6,729,696 B2
DATED         : May 4, 2004
INVENTOR(S)   : John J. Kemer et al.

It is certified that error appears in the above-identified patent and that said Letters Patent is hereby corrected as shown below:

Column 15,
Line 18, please insert a comma -- , -- following "state"

Column 21,
Line 43, please delete "pressure;" and insert -- pressure: --

Column 21,
Lines 38-51, please indent as follows:
A method for controlling pressure to a vehicle spring brake via a valve system, the method comprising:
    applying a service brake for supplying a pressure to an actuating port of an inlet valve;
    if the pressure applied to the actuating port is above a threshold pressure:
        communicating air pressure from an inlet port of the inlet valve to an outlet port of the inlet valve;
        communicating the air pressure from an outlet port to a supply port of a control valve; and
        if a control member is in a release position, communicating the air pressure from the supply port to a delivery port and the spring brake for releasing the spring brake.

Signed and Sealed this

Twenty-sixth Day of October, 2004

JON W. DUDAS
*Director of the United States Patent and Trademark Office*